US010006986B2

(12) United States Patent
Jovicic et al.

(10) Patent No.: US 10,006,986 B2
(45) Date of Patent: *Jun. 26, 2018

(54) LOCATION DETERMINATION USING LIGHT-BASED COMMUNICATIONS

(71) Applicant: QUALCOMM Incorporated, San Diego, CA (US)

(72) Inventors: Aleksandar Jovicic, Jersey City, NJ (US); Hua Wang, Basking Ridge, NJ (US); Elizabeth Gene, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/684,605

(22) Filed: Aug. 23, 2017

(65) Prior Publication Data
US 2017/0350962 A1 Dec. 7, 2017

Related U.S. Application Data

(63) Continuation of application No. 15/081,591, filed on Mar. 25, 2016, now Pat. No. 9,791,544.
(Continued)

(51) Int. Cl.
*G01S 5/16* (2006.01)
*H04B 10/116* (2013.01)
(Continued)

(52) U.S. Cl.
CPC .............. *G01S 5/16* (2013.01); *G01S 5/0263* (2013.01); *H04B 10/116* (2013.01); *H04W 64/006* (2013.01); *H04W 64/00* (2013.01)

(58) Field of Classification Search
CPC ....... G01S 5/16; G01S 5/0263; H04B 10/116; H04W 64/006; H04W 64/00
(Continued)

(56) References Cited

U.S. PATENT DOCUMENTS

2009/0033757 A1 2/2009 Shimada
2011/0176803 A1 7/2011 Song et al.
(Continued)

FOREIGN PATENT DOCUMENTS

WO 2011038269 A1 3/2011
WO 2013016439 A1 1/2013

OTHER PUBLICATIONS

International Search Report and Written Opinion—PCT/US2016/066804—ISA/EPO—dated Mar. 20, 2017.

*Primary Examiner* — Dalzid Singh
(74) *Attorney, Agent, or Firm* — Thien T. Nguyen

(57) ABSTRACT

Disclosed are methods, systems, devices, apparatus, computer-/processor-readable media, and other implementations, including a method, at a processor-based mobile device, that includes determining a first set of candidate positions of the mobile device corresponding to a first time instance based, at least in part, on position data including a first set of identifiers decoded from signals including respective first one or more light-based communications received by the mobile device from a first one or more light devices, with the mobile device being located at a first location at the first time instance. The method further includes selecting at least one candidate position from the first set of candidate positions, in response to a determination that the first set of candidate positions includes more than one candidate position, in order to resolve positional ambiguity, based, at least partly, on further position data from further signals from one or more devices.

30 Claims, 13 Drawing Sheets

Related U.S. Application Data

(60) Provisional application No. 62/289,427, filed on Feb. 1, 2016.

(51) Int. Cl.
*H04W 64/00* (2009.01)
*G01S 5/02* (2010.01)

(58) Field of Classification Search
USPC .......................................................... 398/118
See application file for complete search history.

(56) References Cited

U.S. PATENT DOCUMENTS

| | | | |
|---|---|---|---|
| 2013/0211715 A1* | 8/2013 | Bae .................. | G01S 19/48 701/469 |
| 2014/0274151 A1 | 9/2014 | Pattabiraman et al. | |
| 2014/0280316 A1* | 9/2014 | Ganick .............. | H04B 10/116 707/769 |
| 2015/0003832 A1* | 1/2015 | Yamasaki ............ | H04B 10/116 398/115 |
| 2015/0276399 A1* | 10/2015 | Breuer ................... | G01C 3/08 356/4.03 |
| 2015/0373503 A1 | 12/2015 | Jovicic | |
| 2016/0037293 A1 | 2/2016 | Jovicic et al. | |
| 2016/0249164 A1 | 8/2016 | Jovicic | |
| 2017/0219684 A1 | 8/2017 | Jovicic et al. | |

* cited by examiner

LOCATION DETERMINATION USING LIGHT-BASED COMMUNICATIONS

CROSS-REFERENCE TO RELATED APPLICATIONS

The present application is a continuation of U.S. application Ser. No. 15/081,591 entitled "LOCATION DETERMINATION USING LIGHT-BASED COMMUNICATIONS," and filed Mar. 25, 2016, and claims the benefit of and priority to U.S. Provisional Application Ser. No. 62/289,427, entitled "LOCATION DETERMINATION USING LIGHT-BASED COMMUNICATIONS," and filed Feb. 1, 2016, which is assigned to the assignee hereof, and expressly incorporated herein by reference.

BACKGROUND

Light-based communication messaging, such as visible light communication (VLC), involves the transmission of information through modulation of the light intensity of a light device (e.g., the modulation of the light intensity of one or more light emitting diodes (LEDs)). Generally, visible light communication is achieved by transmitting, from a light device such as an LED or laser diode (LD), a modulated visible light signal, and receiving and processing the modulated visible light signal at a receiver (e.g., a mobile device) that includes a photo detector (PD) or array of PDs (e.g., a complementary metal-oxide-semiconductor (CMOS) image sensor (such as a camera)).

Light-based communication messaging may be used to facilitate location determination for a mobile device. For example, by decoding a codeword (identifier) encoded in a captured light-based communication, the light device that transmitted the light-based communication, and thus, the location of the light device, can be determined. Based on the identified light device, which may be associated with a known position, the position (coordinates and/or orientation of the mobile device relative to the light device) may be derived. In some situations, location determination for a mobile device, based on light-based communication and/or RF signals from wireless devices may result in multiple possible position solutions. For example, in a VLC positioning system, the number of unique fixture identifiers (light devices, wireless devices/nodes, etc.) may be limited (e.g., to around a few thousand). However, in large venues, such as office buildings, there may be more than a few thousand fixtures. In another example, a mobile device may be able to decode only part of a codeword (due to the device's distance and angle from the transmitting light device), with that partially decoded codeword matching several possible identifiers (although, in some situations, the entire codeword may be decoded if additional samples, taken over further time intervals, are obtained, decoding the complete codeword may take too long to be practical). Consequently, there may be an ambiguity (e.g., multiple possible locations) when attempting to determine a position a mobile device based upon signals/communications from devices (e.g., light devices).

SUMMARY

In some variations, a method is provided, at a processor-based mobile device, to determine location of the mobile device. The method includes determining a first set of candidate positions of the mobile device corresponding to a first time instance based, at least in part, on position data including a first set of identifiers decoded from signals including respective first one or more light-based communications received by the mobile device from a first one or more light devices, with the mobile device being located at a first location at the first time instance. The method further includes selecting at least one candidate position from the first set of candidate positions, in response to a determination that the first set of candidate positions includes more than one candidate position, in order to resolve positional ambiguity, based, at least in part, on further position data from further signals from one or more devices.

In some variations, a mobile device is provided that includes memory to store computer instructions, and one or more processors coupled to the memory and configured to determine a first set of candidate positions of the mobile device corresponding to a first time instance based, at least in part, on position data including a first set of identifiers decoded from signals including respective first one or more light-based communications received by the mobile device from a first one or more light devices, with the mobile device being located at a first location at the first time instance. The one or more processors are further configured to select at least one candidate position from the first set of candidate positions, in response to a determination that the first set of candidate positions includes more than one candidate position, in order to resolve positional ambiguity, based, at least in part, on further position data from further signals from one or more devices.

In some variations, an apparatus is provided that includes means for determining a first set of candidate positions of a mobile device corresponding to a first time instance based, at least in part, on position data including a first set of identifiers decoded from signals including respective first one or more light-based communications received by the mobile device from a first one or more light devices, with the mobile device being located at a first location at the first time instance. The apparatus further includes means for selecting at least one candidate position from the first set of candidate positions, in response to a determination that the first set of candidate positions includes more than one candidate position, in order to resolve positional ambiguity, based, at least in part, on further position data from further signals from one or more devices.

In some variations, a non-transitory computer readable media is provided that is programmed with instructions, executable on a processor, to determine a first set of candidate positions of a mobile device corresponding to a first time instance based, at least in part, on position data including a first set of identifiers decoded from signals including respective first one or more light-based communications received by the mobile device from a first one or more light devices, with the mobile device being located at a first location at the first time instance. The computer readable media is further programmed with instructions to select at least one candidate position from the first set of candidate positions, in response to a determination that the first set of candidate positions includes more than one candidate position, in order to resolve positional ambiguity, based, at least in part, on further position data from further signals from one or more devices.

Other and further objects, features, aspects, and advantages of the present disclosure will become better understood with the following detailed description of the accompanying drawings.

BRIEF DESCRIPTION OF THE DRAWINGS

Like reference symbols in the various drawings indicate like elements.

DETAILED DESCRIPTION

Figure 1:
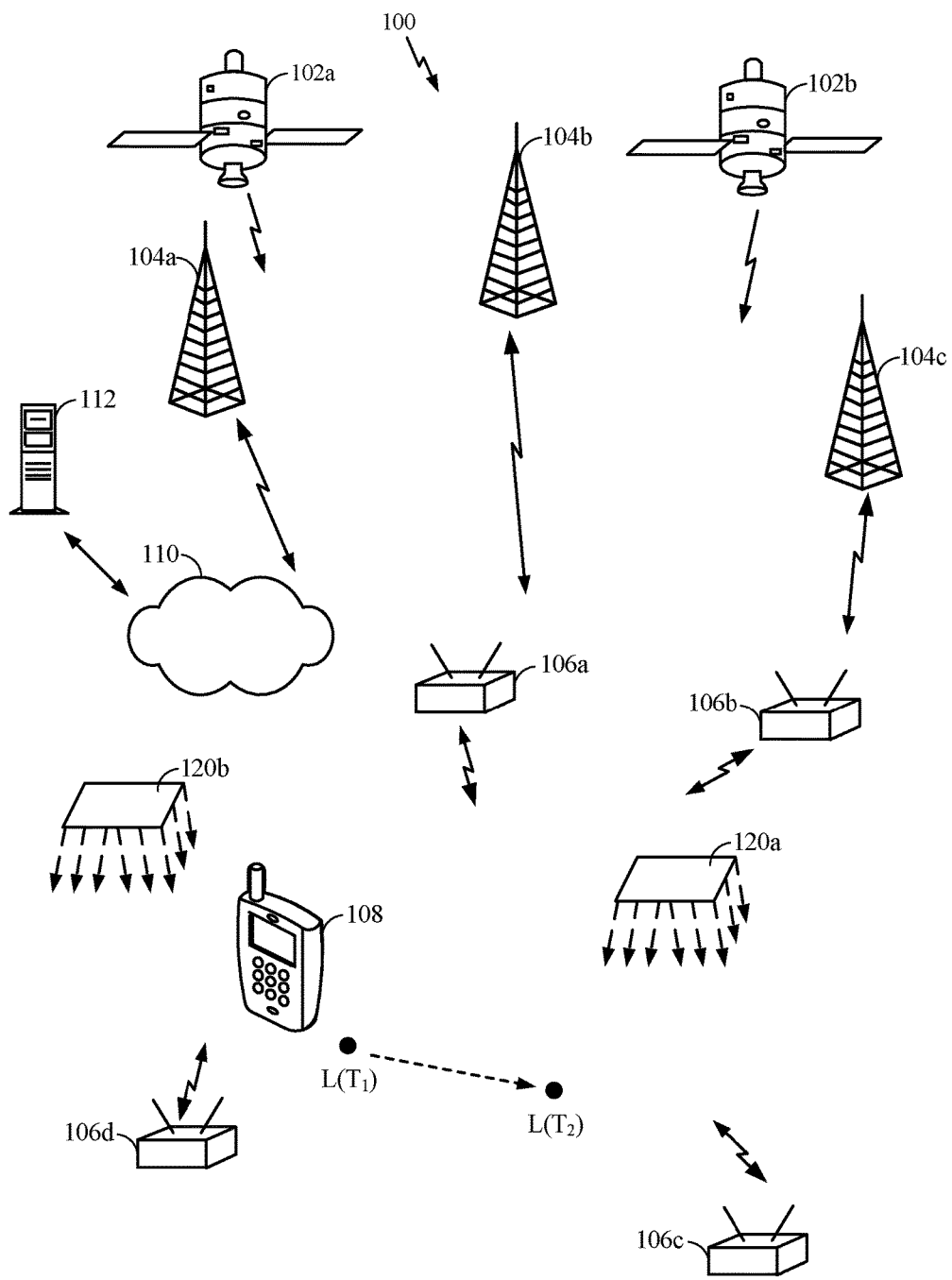
FIG. 1 is a diagram of an example operating environment that includes a wireless mobile device configured to perform operations to facilitate determination of the mobile device's location based on RF signals and/or light-based communication signals, in accordance with certain example implementations.

Described herein are methods, systems, devices, apparatus, computer-/processor-readable media, and other implementations to determine location of a processor-based mobile device (e.g., to resolve position ambiguity resulting from multiple possible candidate positions determined for the mobile device) that includes a method, at the processor-based mobile device, including determining a first set of candidate positions of the mobile device corresponding to a first time instance based, at least in part, on position data including a first set of identifiers decoded from signals including respective first one or more light-based communications received by the mobile device from a first one or more light devices, with the mobile device being located at a first location at the first time instance. The method also includes selecting (in order to resolve positional ambiguity), in response to a determination that the first set of candidate positions includes more than one candidate position, at least one candidate position from the first set of candidate positions in order to resolve positional ambiguity, based, at least in part, on further position data from further signals from one or more devices. In some embodiments, selecting the at least one candidate position from the first set of candidate positions may include selecting the at least one candidate position based further on a distance between the at least one candidate position and another position/location of the mobile device at another time instance. The further position data from the further signals may be determined based on signals from at least one device (e.g., wireless devices/nodes, such as LAN-based access points, cellular base stations, Bluetooth® wireless technology devices, other types of near-field devices, etc.), and/or at least one light-based communication from at least one light device (which may include a light device whose light-based signal was detected at the first time instance). In some embodiments, the method may further include decoding data encoded in the first one or more light-based communications received at the first time instance. Each of the first one or more light-based communications may include a respective one of visual light communication (VLC) signal, and decoding the encoded data may include, for the each of the first one or more light-based communications, capturing a corresponding at least part of at least one image of a scene, comprising a corresponding at least one light device emitting a corresponding VLC signal, identifying from the captured corresponding at least part of the at least one image a corresponding time-domain signal representative of one or more symbols comprising a corresponding VLC codeword encoded in the corresponding VLC signal, and determining, at least in part, the corresponding VLC codeword from the time-domain signal identified from the corresponding captured at least part of the at least one image. Capturing the corresponding at least part of the at least one image of the scene may be performed with a light-capture device such as a digital camera (incorporated in the mobile device), such as a CMOS camera, with a gradual-exposure mechanism (such as a rolling shutter). In some embodiments, the method may further include determining a maximum distance traveled by the mobile device based on a speed value of the mobile device and a time interval length between the other time instance and the first time instance. The speed value may be determined based on, for example, measurements from one or more sensors (e.g., inertial sensors) of the mobile device, a maximum speed value associated with (e.g., assigned to) the mobile device, or any combination thereof.

Thus, with reference to FIG. 1, a diagram of an example operating environment 100 that includes a wireless mobile device 108, configured to perform operations to facilitate determination of the mobile device's location based on RF signals and/or light-based communications signals received and detected by the mobile device 108, is shown. The wireless device 108 may be configured to communicate according to one or more communication protocols (e.g., near-field protocols, such as Bluetooth® wireless technology or Zigbit, WLAN protocols, such as a WiFi protocol according to IEEE 802.11k standard, WWAN protocols, etc.) As will be discussed in greater detail below, the device 108 may be configured, in some embodiments, to determine a first set of candidate positions of the mobile device 108 corresponding to a first time instance based, at least in part, on position data including a first set of identifiers decoded from signals including respective first one or more light-based communications (also referred to as "light-based encoded communications" or "optical communications") received by the mobile device from a first one or more light devices (e.g., light devices 120a and/or 120b), with the mobile device 108 being located at a first location at the first time instance (e.g., the location $L(T_1)$ at a time instance $T_1$).

The mobile device 108 may also be configured, in response to a determination that the first set of candidate positions includes more than one candidate position, to select at least one candidate position from the first set of candidate positions (in order to resolve positional ambiguity) based, at least in part, on further position data from further signals from one or more devices (e.g., wireless and/or light devices). In some embodiments, the selection of the at least one candidate position may be implemented based on a distance between the at least one candidate position and another location of the mobile device at another time instance. The other location of the mobile device 108 may be a location at an earlier or later (subsequent) time instance (e.g., in FIG. 1, a subsequent location, $L(T_2)$, for the mobile device 108n at a time instance $T_2$, is depicted). The mobile device may also be configured to receive and decode light-based communication(s) from one or more light devices (e.g., the light devices 120a-b), such as visual light communication (VLC) signals.

The mobile device 108 (as well as any other device depicted in FIG. 1) may be configured to operate and interact with multiple types of other communication systems/devices, including local area network devices (or nodes), such as WLAN for indoor communication, femtocells, Bluetooth® wireless technology-based transceivers, and other types of indoor communication network nodes, wide area wireless network nodes, satellite communication systems, other mobile devices, etc., and as such the mobile device 108 may include one or more interfaces and/or transceivers to communicate with the various types of communications systems. The various devices of FIG. 1 may be configured to establish and operate according to any number of communication protocols.

As noted, the environment 100 may contain one or more different types of wireless communication systems or nodes, each of which may be used to establish communication links with the device 108. The nodes illustrated in FIG. 1 include wireless access points (or WAPs) and may include LAN and/or WAN wireless transceivers, including, for example, WiFi base stations, femto cell transceivers, Bluetooth® wireless technology transceivers, cellular base stations, WiMax transceivers, etc. Thus, for example, and with continued reference to FIG. 1, the environment 100 may include the Local Area Network Wireless Access Points (LAN-WAPs) 106a-d that may be used for wireless voice and/or data communication with the mobile device 108. The LAN-WAPs 106a-d may also be utilized, in some embodiments, as independent sources of position data, e.g., through fingerprinting-based procedures, through implementation of multilateration-based procedures based, for example, on timing-based techniques (e.g., RTT-based measurements), signal strength measurements (e.g., RSSI measurements), etc. The LAN-WAPs 106a-d can be part of a Wireless Local Area Network (WLAN), which may operate in buildings and perform communications over smaller geographic regions than a WWAN. Additionally in some embodiments, the LAN-WAPs 106a-d could also include pico or femto cells. In some embodiments, the LAN-WAPs 106a-d may be part of, for example, WiFi networks (802.11x), cellular piconets and/or femtocells, Bluetooth® wireless technology Networks, etc. Although five (5) LAN-WAP's are depicted in FIG. 1, any number of such LAN-WAP's may be used, and, in some embodiments, the environment 100 may include no LAN-WAPs at all, or may include a single LAN-WAP.

As further illustrated, the environment 100 may also include a plurality of one or more types of the Wide Area Network Wireless Access Points (WAN-WAPs) 104a-c, which may be used for wireless voice and/or data communication, and may also serve as another source of independent information through which the mobile wireless device 108 (and/or other devices) may determine its position/location. The WAN-WAPs 104a-c may be part of wide area wireless network (WWAN), which may include cellular base stations, and/or other wide area wireless systems, such as, for example, WiMAX (e.g., 802.16). A WWAN may include other known network components which are not shown in FIG. 1. Typically, each WAN-WAPs 104a-c within the WWAN may operate from fixed positions or may be moveable, and may provide network coverage over large metropolitan and/or regional areas. Although three (3) WAN-WAPs are depicted in FIG. 1, any number of such WAN-WAPs may be used. In some embodiments, the environment 100 may include no WAN-WAPs at all, or may include a single WAN-WAP.

Communication to and from the mobile device 108 (to exchange data, and facilitate location determination operations and other services to the device 108, etc.) may be implemented using various wireless communication networks and/or technologies and/or encodings, such as a wide area wireless network (WWAN), a wireless local area network (WLAN), a wireless personal area network (WPAN), a peer-to-peer network, and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other radio access technology (RAT). GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. In some embodiments, 4G networks, Long Term Evolution ("LTE") networks, Advanced LTE networks, Ultra Mobile Broadband (UMB) networks, and all other types of cellular communications networks may also be implemented and used with the systems, devices methods, and other implementations described herein. A WLAN may also be implemented, at least in part, using an IEEE 802.11x network, and a WPAN may be a Bluetooth® wireless technology network, an IEEE 802.15x, or some other type of network. The techniques described herein may also be used for any combination of WWAN, WLAN and/or WPAN.

In some embodiments, and as further depicted in FIG. 1, the mobile device 108 may also be configured to at least receive information from a Satellite Positioning System (SPS) 102a-b, which may be used as an independent source of position information for the mobile device 108. The mobile device 108 may thus include one or more dedicated SPS receivers configured to receive signals for deriving device geo-location information from the SPS satellites. In embodiments in which the mobile device 108 can receive satellite signals, the mobile device may utilize a receiver (e.g., a GNSS receiver) specifically implemented for use with the SPS to extract position data from a plurality of signals transmitted by at least the SPS satellites 102a-b. Transmitted satellite signals may include, for example, signals marked with a repeating pseudo-random noise (PN) code of a set number of chips and may be located on ground based control stations, user equipment and/or space vehicles. The techniques provided herein may be applied to, or otherwise implemented, for use in various other systems, such as, e.g., Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with, or otherwise enabled, for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

As further shown in FIG. 1, the system 100 may further include a server 110 (e.g., a location server, or any other type of server) configured to communicate, via a network 112 (e.g., a cellular wireless network, a WiFi network, a packet-based private or public network, such as the public Internet), or via wireless transceivers included with the server 110, with multiple network elements or nodes, and/or mobile wireless devices. For example, the server 110 may be configured to establish communication links with one or more of the WLAN nodes, such as the access points 106a-d, which may be part of the network 112, to communicate data and/or control signals to those access points, and receive data and/or control signals from the access points. Each of the access points 106a-d can, in turn, establish communication links with mobile devices located within range of the respective access points 106a-d. The server 110 may also be configured to establish communication links (directly via a wireless transceiver(s), or indirectly, via a network connection) with one or more of the WWAN nodes, such as the WWAN access points 104a-c depicted in FIG. 1, which may also be part of the network 112, and/or to establish communication links with mobile wireless devices (such as the device 108), the light devices 120a-b, etc. The server 110 may also be configured to at least receive information from satellite vehicles 102a and/or 102b of a Satellite Positioning System (SPS), which may be used as an independent source of position information. In some embodiments, the server 110 may be part of, attached to, or reachable from network 112, and may communicate with the mobile wireless device 108, or with any other device or node depicted in FIG. 1, including the light devices 120a-b, directly or via some network.

Figure 2:
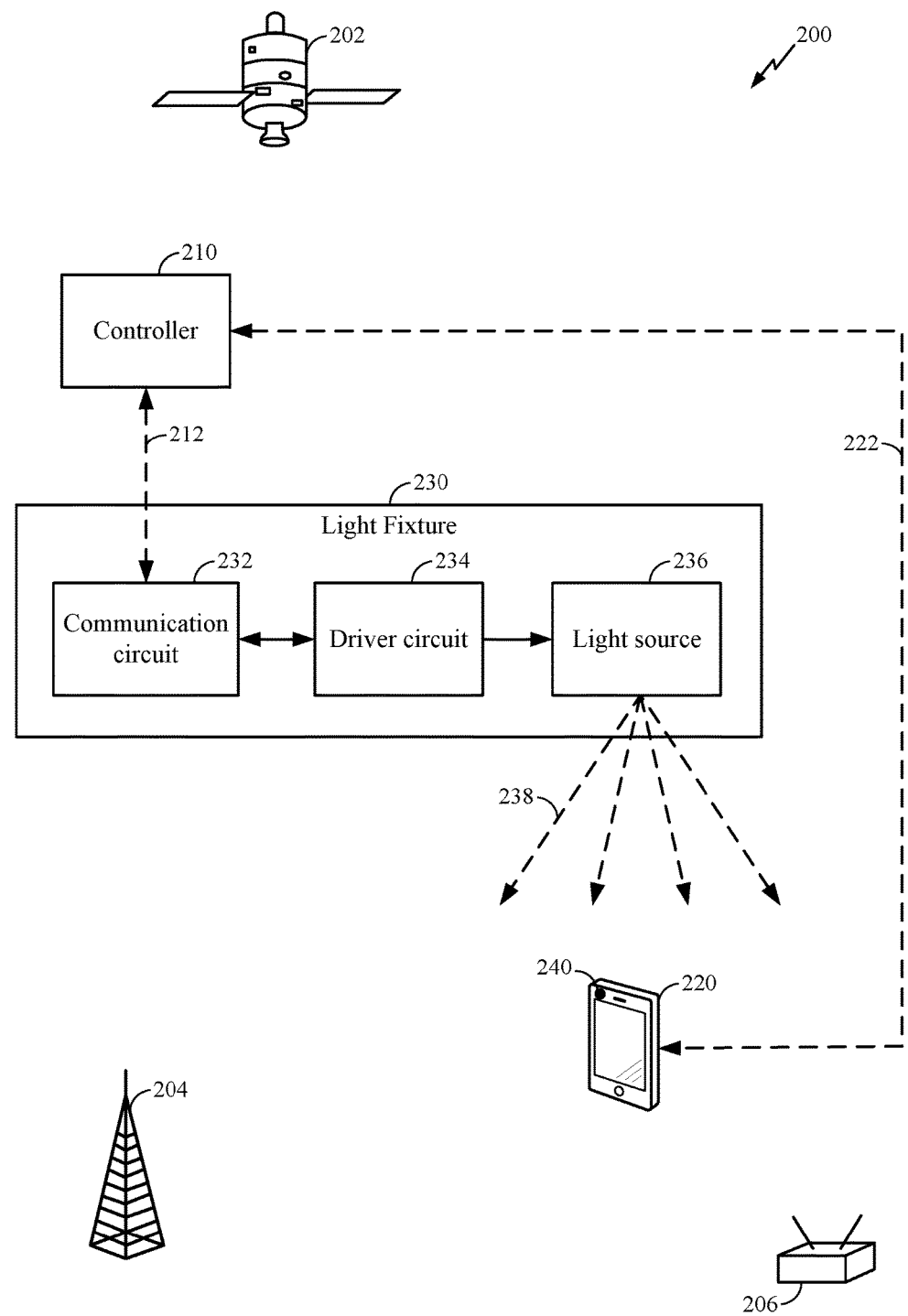
FIG. 2 is a schematic diagram of a light-based communication system, in accordance with certain example implementations.

With reference to FIG. 2, a schematic diagram of an example light-based communication system 200 that can be used to transmit light-based communications (such as VLC signals) is shown. The light-based communication system 200 includes a controller 210 configured to control the operation/functionality of a light device 230 (also referred to as a light fixture). The light device 230 (optionally in conjunction with the controller 210) may be similar, in configuration and/or functionality, to the light devices 120a-b schematically depicted in FIG. 1. The system 200 further includes a mobile device 220, which may be similar to, in configuration and/or functionality, the mobile device 108 of FIG. 1, and is configured to receive and capture light emissions from a light source of the light device 230 (e.g., using a light sensor, also referred to as a light-based communication receiver module, such as the light-based communication receiver module 512 depicted in FIG. 5), and to decode data encoded in the emitted light from the light device 230. Light emitted by a light source 236 of the light device 230 may be controllably modulated to include sequences of pulses (of fixed or variable durations) corresponding to codewords to be encoded into the emitted light. As will become apparent below, in some embodiments, visible pulses for codeword frames emitted by the light device 230 are captured by a light-capture unit 240 (which includes at least one lens and a sensor array) of the mobile device 220, and are decoded (e.g., by identifying from the captured at least part of the at least one image a time-domain signal representative of one or more symbols comprising a visual light communication (VLC) codeword encoded in the VLC signal, and determining, at least in part, the VLC codeword from the time-domain signal identified from the captured at least part of the at least one image).

In some embodiments, the light-based communication system 200 may include any number of controllers such as the controller 210, mobile devices, such as the mobile device 220, and/or light devices, such as the light device (fixture) 230. In some embodiments, the functionality of the controller 210 (or aspects of the controller 210) may be implemented by the mobile device 220. In such embodiments the mobile device 220 may communicate directly with the light device 230. In some embodiments, the system 200 may be constituted similarly (in configuration and/or functionality) to the environment 100 of FIG. 1.

As further shown in FIG. 2, the light device 230 includes, in some embodiments, a communication circuit 232 to communicate with, for example, the controller 210 (via a link or channel 212, which may be a WiFi link, a link established over a power line, a LAN-based link, etc.), a driver circuit 234, and/or a light source 236. The communication circuit 232 may include one or more transceivers, implemented according to any one or more of communication technologies and protocols, including IEEE 802.11 (WiFI) protocols, near field technologies (e.g., Bluetooth® wireless technology network, ZigBee, etc.), cellular WWAN technologies, etc., and may also be part of a network (a local area network (LAN), a wireless LAN (WLAN), a wide area network (WAN), a wireless WAN (WWAN), etc.) assigned with a unique network address (e.g., an IP address). The communication circuit 232 may be implemented to provide wired communication, and may thus be connected to the controller 210 via a physical communication link. The controller 210 may in turn be a network node in a communication network to enable network-wide communication to and from the light device/fixture 230. In some implementations, the controller may be realized as part of the communication circuit 232. In some embodiments, the controller may be configured to set/reset the codeword at each of the light fixtures. A light device/fixture may have a sequence of codewords, and the controller may be configured to provide a control signal to cause the light fixture to cycle through its list of codewords. Alternatively and/or additionally, in some embodiments, light fixtures may be addressable so that a controller (such as the controller 210 of FIG. 2) may access a particular light device/fixture to provide instructions, new code words, light intensity, frequency, and other parameters for any given fixture.

In some examples, the light source 236 may include one or more light emitting diodes (LEDs) and/or other light emitting elements. In some configurations, a single light source or a commonly controlled group of light emitting elements may be provided (e.g., a single light source, such as the light source 236 of FIG. 2, or a commonly controlled group of light emitting elements may be used for ambient illumination and light-based communication transmissions). In other configurations, the light source 236 may be replaced with multiple light sources or separately controlled groups of light emitting elements (e.g., a first light source may be used for ambient illumination, and a second light source may be used to implement coded light-based communication such as VLC signal transmissions).

The driver circuit 234 (e.g., an intelligent ballast) may be configured to drive the light source 236. For example, the driver circuit 234 may be configured to drive the light source 236 using a current signal and/or a voltage signal to cause the light source to emit light modulated to encode information representative of a codeword (or other data) that the light source 236 is to communicate. As such, the driver circuit may be configured to output electrical power according to a pattern that would cause the light source to controllably emit light modulated with a desired codeword (e.g., an identifier). In some implementations, some of the functionality of the driver circuit 234 may be implemented at the controller 210.

By way of example, the controller 210 may be implemented as a processor-based system (e.g., a desktop computer, server, portable computing device or wall-mounted control pad). As noted, at least some of the functionality of the controller 210 may be provided by the mobile device 220. For example, controlling signals to control the driver circuit 234 may be communicated from the mobile device 220 to the controller 210 via, for example, a wireless communication link/channel 222, and the transmitted controlling signals may then be forwarded to the driver circuit 234 via the communication circuit 232 of the fixture 230. In some embodiments, the controller 210 may also be implemented as a switch, such as an ON/OFF/dimming switch. A user may control performance attributes/characteristics for the light fixture 230, e.g., an illumination factor specified as, for example, a percentage of dimness, via the controller 210, which illumination factor may be provided by the controller 210 to the light fixture 230. In some examples, the controller 210 may provide the illumination factor to the communication circuit 232 of the light device 230. By way of example, the illumination factor, or other controlling parameters for the performance behavior of the light fixture and/or communications parameters, timing, identification and/or behavior, may be provided to the communication circuit 232 over a power line network, a wireless local area network (WLAN; e.g., a Wi-Fi network), a wireless wide area network (WWAN; e.g., a cellular network such as a Long Term Evolution (LTE) or LTE-Advanced (LTE-A) network), and/or via a wired network.

In some embodiments, the controller 210 may also provide the light device/fixture 230 with a codeword (e.g., an identifier) for repeated transmission using VLC. The controller 210 may also be configured to receive status information from the light device 230. The status information may include, for example, a light intensity of the light source 236, a thermal performance of the light source 236, and/or the codeword (or identifying information) assigned to the light fixture 230.

The mobile device 220 may be implemented, for example, as a mobile phone or tablet computer, and may be configured to communicate over different access networks, such as other WLANs and/or WWANs and/or personal area networks (PANs). The mobile device may communicate unidirectionally or bi-directionally with the controller 210, and/or with other devices and nodes in the system. As noted, the mobile device 220 may also communicate directly with the light device 230.

When the light device 230 is in an ON state, the light source 236 may provide ambient illumination 238 which may be captured by, for example, the light-capture device 240, e.g., a camera such as a CMOS camera, a charge-couple device (CCD)-type camera, etc., of the mobile device 220. In some embodiments, the camera may be implemented with a rolling shutter mechanism configured to capture image data from a scene over some time period by scanning the scene vertically or horizontally so that different areas of the captured image correspond to different time instances. The light source 236 may also emit light-based communication transmissions that may be captured by the light-capture device 240. The illumination and/or light-based communication transmissions may be used by the mobile device 220 for navigation and/or other purposes.

As also shown in FIG. 2, the light-based communication system 200 may be configured for communication with one or more different types of wireless communication systems or nodes. Such nodes, also referred to as wireless access points (or WAPs) may include LAN and/or WAN wireless transceivers, including, for example, WiFi base stations, femto cell transceivers, Bluetooth® wireless technology transceivers, cellular base stations, WiMax transceivers, etc. Thus, for example, one or more Local Area Network Wireless Access Points (LAN-WAPs), such as a LAN-WAP 206, which may be similar, in configuration and/or functionality, to any of the LAN-WAP's 106a-d of FIG. 1, may be used to provide wireless voice and/or data communication with the mobile device 220 and/or the light device 230 (e.g., via the controller 210). The light-based communication system 200 may also be configured for communication with one or more Wide Area Network Wireless Access Points, such as a WAN-WAP 204, which may be similar to, in configuration, and/or functionality, to any of the WAN-WAP 104a-c depicted in FIG. 1, and may be used for wireless voice and/or data communication, and may also serve as another source of independent information through which the mobile device 220, for example, may determine its position/location. In some embodiments, any of the controller 210, the mobile device 220, and/or the light device/fixture 230 may also be configured to at least receive information from a Satellite Positioning System (SPS) that includes a satellite 202, which may be similar to, in configuration and/or functionality, to any of the satellites 102a-b of FIG. 1, and which may be used as an independent source of position information for the mobile device 220 (and/or for the controller 210 or the fixture 230).

Thus, the mobile device 220 may receive signals (RF and/or light-based signals), or otherwise communicate with, any one or a combination of the SPS satellites (such as the satellite 202), WAN-WAPs (such as the WAN-WAP 204), LAN-WAPs (such as the LAN-WAP 206), and/or light devices (such as the light device/fixture 230). In some embodiments, each of the aforementioned systems can provide independent position information based on which an estimate of the location for the mobile device 220 may be derived using different techniques. In some embodiments, the mobile device may combine the solutions derived from each of the different types of devices to improve the accuracy of the position data. Position information obtained from RF transmissions may supplement or used independently of position information derived, for example, based on data determined from decoding light-based communications provided by the light device 230 (through emissions from the light source 236). In situations where the combination of information provided to the mobile device nevertheless results in ambiguity in the position/location determined for the mobile device (for example, because light devices may be assigned non-unique identifiers, because the distance between the mobile device 220 and the light device 230 is far enough that the mobile device may be able to decode only a portion of the identifier encoded in the received light-based communication, with that decoded portion corresponding to multiple different identifier that are each associated with a different respective light device, etc.), the mobile device may be implemented to resolve the positional ambiguity based on further signals (e.g., received at another location) and/or based on a distance value (e.g., maximum possible distance). Thus, the mobile device 220 may be configured to determine a first set of candidate positions of the mobile device corresponding to a first time instance (at which the mobile device is located at a first location) based, at least in part, on position data that includes a first set of identifiers decoded from signals including respective first one or more light-based communications received by the mobile device from a first one or more light devices, and in response to a determination that the first set of candidate positions includes more than one candidate position, to select (in order to resolve positional ambiguity) at least one candidate position from the first set of candidate positions based, at least in part, on further position data from further signals from one or more devices (e.g., based on identifiers encoded in light-based communications received at another time instance, based on RF signals, etc.) For example, in some embodiments, selecting the at least one candidate position may include selecting the at least one candidate position based on a distance measure between the at least one candidate position of the mobile device corresponding to the first time instance and another location (determined based on further signals from one or more devices, which may be light device or wireless/RF devices) of the mobile device at another time instance. In some embodiments, at least some of the operations configured to be performed by the device 220 (e.g., determine location of the mobile device) may be performed at a remote device or node (such as the server 110 depicted in FIG. 1).

Figure 3:
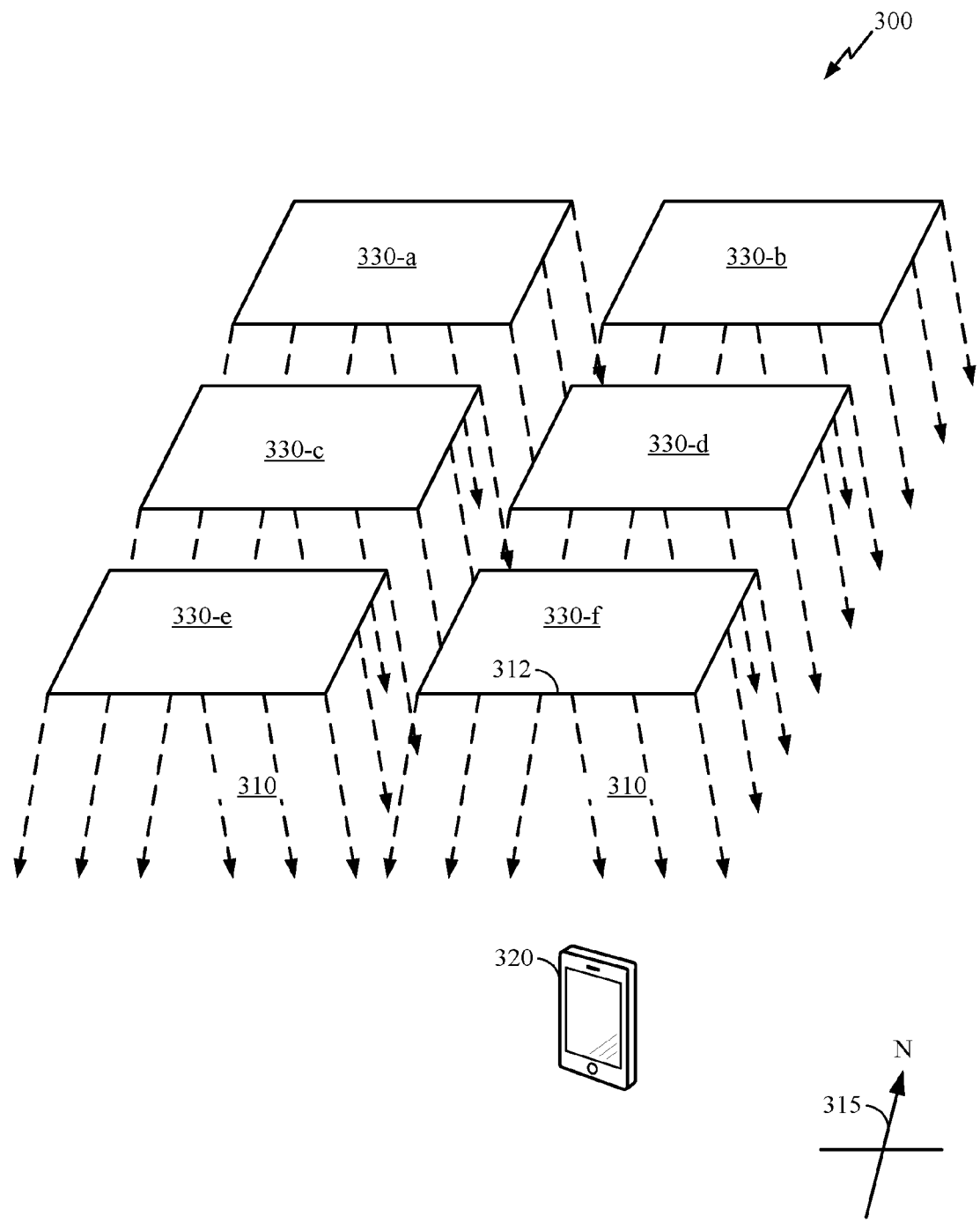
FIG. 3 is a diagram of another light-based communication system with multiple light devices, in accordance with certain example implementations.

With reference now to FIG. 3, a diagram of an example light-based communication system 300 is shown. The system 300 includes a mobile device 320 (which may be similar in configuration and/or functionality to the mobile devices 108 or 220 of FIGS. 1 and 2) positioned near (e.g., below) a number of light devices/fixtures 330-a, 330-b, 330-c, 330-d, 330-e, and 330-f. The light devices 330-a, 330-b, 330-c, 330-d, 330-e, and 330-f may, in some cases, be examples of aspects of the light device 120a-b and/or the light device 230 described with reference to FIGS. 1 and 2. The light devices 330-a, 330-b, 330-c, 330-d, 330-e, and 330-f may, in some examples, be overhead light devices/fixtures in a building (or overhead street/area lighting out of doors), which may have fixed locations with respect to a reference (e.g., a global positioning system (GPS) coordinate system and/or building floor plan). In some embodiments, the light devices 330-a, 330-b, 330-c, 330-d, 330-e, and 330-f may also have fixed orientations with respect to a reference (e.g., a meridian passing through magnetic north 315).

As the mobile device 320 moves (or is moved) under one or more of the light devices/fixtures 330-a, 330-b, 330-c, 330-d, 330-e, and 330-f, a light-capture device of the mobile device 320 (which may be similar to the light-capture device 240 of FIG. 2) may receive light 310 emitted by one or more of the light fixtures 330-a, 330-b, 330-c, 330-d, 330-e, and 330-f and capture an image of part or all of one or more of the light fixtures 330-a, 330-b, 330-c, 330-d, 330-e, and 330-f. The captured image(s) may include an illuminated reference axis, such as the illuminated edge 312 of the light fixture 330-f. Such illuminated edges may enable the mobile device to determine its location and/or orientation with reference to one or more of the light devices 330-a, 330-b, 330-c, 330-d, 330-e, and 330-f. Alternatively or additionally, the mobile device 320 may receive, from one or more of the light devices 330-a, 330-b, 330-c, 330-d, 330-e, and 330-f, light-based communication (e.g., VLC signals) transmissions that include codewords (comprising symbols), such as identifiers, of one or more of the light fixtures 330-a, 330-b, 330-c, 330-d, 330-e, and/or 330-f. The received codewords may be used to generally determine a location of the mobile device 320 with respect to the light devices 330-a, 330-b, 330-c, 330-d, 330-e, and 330-f, and/or to look up locations of one or more of the light devices 330-a, 330-b, 330-c, 330-d, 330-e, and 330-f and determine, for example, a location of the mobile device 320 with respect to a coordinate system and/or building floor plan. Additionally or alternatively, the mobile device 320 may use the locations of one or more of the light fixtures 330-a, 330-b, 330-c, 330-d, 330-e, and 330-f, along with captured images (and known or measured dimensions and/or captured images of features, such as corners or edges) of the light devices 330-a, 330-b, 330-c, 330-d, 330-e, and 330-f, to determine a more precise location and/or orientation of the mobile device 320. Upon determining the location and/or orientation of the mobile device 320, the location and/or orientation may be used for navigation by the mobile device 320. In embodiments in which, based on the captured images of the one or more light devices 330-a, 330-b, 330-c, 330-d, 330-e, and 330-f, multiple possible position solutions exist for the mobile device 320 (e.g., due to ambiguity resulting from non-uniqueness of the identifiers, or because of incomplete determination of the identifiers associated with the light devices), the mobile device is configured to resolve the ambiguity (as more particularly discussed in relation to FIGS. 9, 10, and 11) based on, for example, further position data (obtained at another location), and/or based on a distance value (e.g., maximum distances) between the location/position approximations corresponding to the two time instances.

Figure 4:
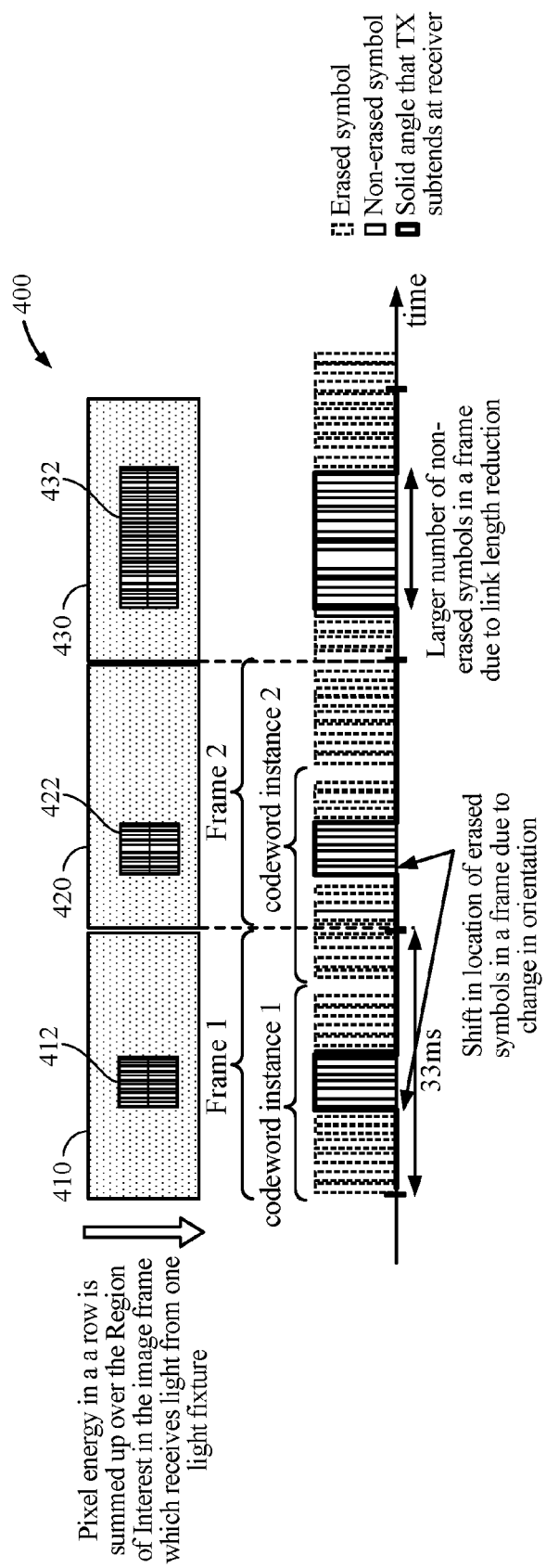
FIG. 4 is a diagram illustrating captured images, over three separate frames, of a scene that includes a light device emitting a coded light-based message, in accordance with certain example implementations.

As noted, a receiving device (e.g., a mobile phone, such as the devices 108, 220, or 320 of FIGS. 1-3, or some other mobile device) uses its light-capture device, which is equipped with a gradual-exposure module/circuit (e.g., a rolling shutter) to capture a portion of, or all of, a transmission frame of the light source (during which part of, or all of, a codeword the light source is configured to communicate is transmitted). A light-capture device employing a rolling shutter, or another type of gradual-exposure mechanism, captures an image (or part of an image) over some predetermined time interval such that different rows in the frame are captured at different times, with the time associated with the first row of the image and the time associated with the last row of the image defining a frame period. In embodiments in which the mobile device is not stationary, the portion of a captured image corresponding to the light emitted from the light source will vary. For example, with reference to FIG. 4, a diagram 400 illustrating captured images, over three separate frames, of a scene that includes a light source emitting a light-based communication (e.g., a VLC signal), is shown. Because the receiving device's spatial relationship relative to the light source varies over the three frames (e.g., because the device's distance to the light source is changing, and/or because the device's orientation relative to the light source is changing, etc.), the region of interest in each captured image will also vary. In the example of FIG. 4, variation in the size and position of the region of interest in each of the illustrated captured frames may be due to a change in the orientation of the receiving device's light-capture device relative to the light source (the light source is generally stationary). Thus, for example, in a first captured frame 410 the light-capture device of the receiving device is at a first orientation (e.g., angle and distance) relative to the light source so that the light-capture device can capture a region of interest, corresponding to the light source, with first dimensions 412 (e.g., size and/or position). At a subsequent time interval, corresponding to a second transmission frame for the light source (during which the same codeword may be communicated), the receiving device has changed its orientation relative to the light source, and, consequently, the receiving device's light-capture device captures a second image frame 420 in which the region of interest corresponding to the light source has second dimensions 422 (e.g., size and/or a position) different from the first dimensions of the region of interest in the first frame 410. During a third time interval, in which the receiving device may again have changed its orientation relative to the light source, a third image frame 430, that includes a region of interest corresponding to the light source, is captured, with the region of interest including third dimensions 432 that are different (e.g., due to the change in orientation of the receiving device and its light-capture device relative to the light source) from the second dimensions.

Thus, as can be seem from the illustrated regions of interest in each of the captured frames 410, 420, and 430 of FIG. 4, the distance and orientation of the mobile image sensor relative to the transmitter (the light device) impacts the number and positions of symbol erasures per frame. At long range, it is possible that all but a single symbol per frame is erased (even the one symbol observed may have been partially erased). As noted, in such situations, the mobile device may be able to decode only a portion of a codeword transmitted by the transmitter, which consequently may lead to an ambiguity in the position of the mobile device, i.e., the partly decoded codeword may correspond to multiple transmitters (each associated with a known position), thus resulting in multiple possible mobile device positions being determined, each corresponding to a different one of the multiple transmitters.

Figure 5:
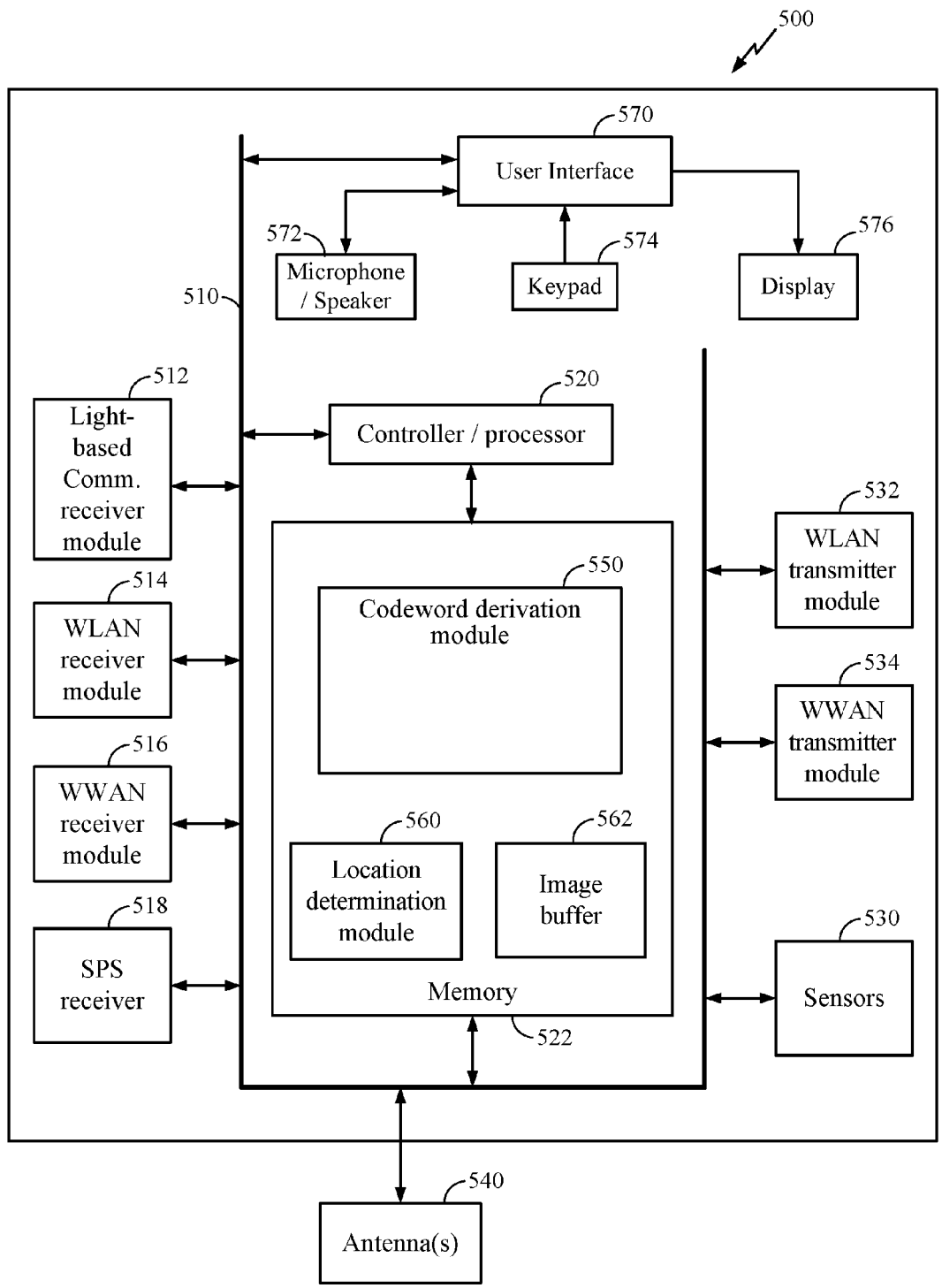
FIG. 5 is a block diagram of a device configured to detect signals from different devices/sources, and to determine based, at least in part, on a decoded codeword in a detected light-based communication the location of the device, in accordance with certain example implementations.

With reference now to FIG. 5, a block diagram of an example device 500 (e.g., a mobile device, such as a cellular phone, or a stationary device that includes a camera) configured to detect signals from different devices/sources, including to capture an image(s) of a light device transmitting a light-based communication (e.g., a communication comprising VLC signals) corresponding to, for example, an assigned codeword, and to determine based, at least in part, on the decoded codeword, the location of the device, is shown. The device 500 may be similar in implementation and/or functionality to the devices 108, 220 or 320 of FIGS. 1-3. For the sake of simplicity, the various features/components/functions illustrated in the schematic boxes of FIG. 5 are connected together using a common bus 510 to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 5 may be further subdivided, or two or more of the features or functions illustrated in FIG. 5 may be combined. Additionally, one or more of the features, components, or functions illustrated in FIG. 5 may be excluded. In some embodiments, some or all of the components depicted in FIG. 5 may also be used in implementations of one or more of the light devices (e.g. the devices 120a-b of FIG. 1, the device 230 with or without the controller 210 depicted in FIG. 2), or may be used with any other device or node described herein.

As noted, in some embodiments, an assigned codeword, encoded into repeating light-based communications transmitted by a light device (e.g., via the light source 236 of the light device 230 of FIG. 2) may include, for example, an identifier codeword to identify the light device (the light device may be associated with location information, and thus, identifying the light device may facilitate position determination for the receiving device) or may include other types of information (which may be encoded using other types of encoding schemes). As shown, in some implementations, the device 500 may include receiver modules, a controller/processor module 520 to execute application modules (e.g., software-implemented modules stored in a memory storage device 522), and/or transmitter modules. Each of these components may be in communication (e.g., electrical communication) with each other. The components/units/modules of the device 500 may, individually or collectively, be implemented using one or more application-specific integrated circuits (ASICs) adapted to perform some or all of the applicable functions in hardware. Alternatively and/or additionally, functions of the device 500 may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs). The functions of each unit may also be implemented, in whole or in part, with instructions embodied in a memory, formatted to be executed by one or more general or application-specific processors. The device 500 may have any of various configurations, and may in some cases be, or include, a cellular device (e.g., a smartphone), a computer (e.g., a tablet computer), a wearable device (e.g., a watch or electronic glasses), a module or assembly associated with a vehicle or robotic machine (e.g., a module or assembly associated with a forklift, a vacuum cleaner, a car, etc.), and so on. In some embodiments, the device 500 may have an internal power supply (not shown), such as a small battery, to facilitate mobile operation. Further details about an example implementation of a processor-based device which may be used to realize, at least in part, the device 1200, is provided below with respect to FIG. 12.

As further shown in FIG. 5, the receiver modules may include a light-based communication receiver module 512, which may be a light-capture device similar to the light-capture device 240 of FIG. 2, configured to receive a light-based communication such as a VLC signal (e.g., from a light source such as the light source 236 of FIG. 2, or from light sources of any of the light devices 120a-b or 330-a-f depicted in FIGS. 1 and 3). In some embodiments, the lens of the light-capture device (more than one lens may be included in some light-capture devices) may be a fixed-focus lens (e.g., for use with cameras installed in vehicles to facilitate driving and/or to implement vehicle safety systems), while in some embodiments, the lens may be a variable focus lens. The light-based communication receiver module 512 may also include a photo detector (PD) or array of PDs, e.g., a complementary metal-oxide-semiconductor (CMOS) image sensor (e.g., camera), a charge couple device, or some other sensor-based camera. The light-based communication receiver module 512 may be implemented as a gradual-exposure light-capture device, e.g., a rolling shutter image sensor. In such embodiments, the image sensor captures an image over some predetermined time interval such that different rows in the frame are captured at different times. The light-based communication receiver module 512 may be used to receive, for example, one or more VLC signals in which one or more identifiers, or other information, are encoded. An image captured by the light-based communication receiver module 512 may be stored in a buffer such as an image buffer 562 which may be a part of a memory storage device 522 schematically illustrated in FIG. 5. In some embodiments, two or more light-based communication receiver modules 512 could be used, either in concert or separately, to reduce the number of erased symbols and/or to improve light-based communication functionality from a variety of orientations, for example, by using both front and back mounted light-capture devices on a mobile device such as any of the mobile devices 108, 220, 320, and/or 500 described herein.

Additional receiver modules/circuits that may be used instead of, or in addition to, the light-based communication receiver module 512 may include one or more radio frequency (RF) receiver modules/circuits/controllers that are connected to one or more antennas 540. As noted, RF signals received and measured through such RF modules may facilitate position determination which may be used to estimate positioning of the mobile device (e.g., if position-determination based on light-based communications is either not available, or results in an ambiguity due to existence of multiple position solutions). For example, the device 500 may include a wireless local area network (WLAN) receiver module 514 configured to enable, for example, communication according to IEEE 802.11x (e.g., a WiFi receiver). In some embodiments, the WLAN receiver 514 may be configured to communicate with other types of local area networks, personal area networks (e.g., Bluetooth® wireless technology networks, or other types of near-field networks), etc. Other types of wireless networking technologies may also be used including, for example, Ultra Wide Band, ZigBee, wireless USB, etc. In some embodiments, the device 500 may also include a wireless wide area network (WWAN) receiver module 516 comprising suitable devices, hardware, and/or software for communicating with and/or detecting signals from one or more of, for example, WWAN access points and/or directly with other wireless devices within a network. In some implementations, the WWAN receiver may comprise a CDMA communication system suitable for communicating with a CDMA network of wireless base stations. In some implementations, the WWAN receiver module 516 may facilitate communication with other types of cellular telephony networks, such as, for example, TDMA, GSM, WCDMA, LTE, etc. Additionally, any other type of wireless networking technologies may be used, including, for example, WiMax (802.16), etc. In some embodiments, an SPS receiver 518 (also referred to as a global navigation satellite system (GNSS) receiver) may also be included with the device 500. The SPS receiver 518, as well as the WLAN receiver module 514 and the WWAN receiver module 516, may be connected to the one or more antennas 540 for receiving RF signals. The SPS receiver 518 may comprise any suitable hardware and/or software for receiving and processing SPS signals. The SPS receiver 518 may request information as appropriate from other systems, and may perform computations necessary to determine the position of the mobile device 500 using, in part, measurements obtained through any suitable SPS procedure.

In some embodiments, the device 500 may also include one or more sensors 530 such as an accelerometer, a gyroscope, a geomagnetic (magnetometer) sensor (e.g., a compass), any of which may be implemented based on micro-electro-mechanical-system (MEMS), or based on some other technology. Directional sensors such as accelerometers and/or magnetometers may, in some embodiments, be used to determine the device orientation relative to a light fixture(s), or used to select between multiple light-capture devices (e.g., light-based communication receiver module 512). Additionally, such sensors may be used, in some embodiments, to obtain an exact or approximate measure of speed/velocity and/or distance traveled by the mobile device between two locations, based on which one or more of possible positions solutions derived at one of those location may be selected or eliminated (to thus facilitate resolving positioning ambiguity). Other sensors that may be included with the device 500 may include an altimeter (e.g., a barometric pressure altimeter), a thermometer (e.g., a thermistor), an audio sensor (e.g., a microphone) and/or other sensors. The output of the sensors may be provided as part of the data based on which operations, such as location determination and/or navigation operations, may be performed.

In some examples, the device 500 may include one or more RF transmitter modules connected to the antennas 540, and may include one or more of, for example, a WLAN transmitter module 532 (e.g., a Wi-Fi transmitter module, a Bluetooth® wireless technology networks transmitter module, and/or a transmitter module to enable communication with any other type of local or near-field networking environment), a WWAN transmitter module 534 (e.g., a cellular transmitter module such as an LTE/LTE-A transmitter module), etc. The WLAN transmitter module 532 and/or the WWAN transmitter module 534 may be used to transmit, for example, various types of data and/or control signals (e.g., to the controller 210 connected to the light device 230 of FIG. 2) over one or more communication links of a wireless communication system. In some embodiments, the transmitter modules and receiver modules may be implemented as part of the same module (e.g., a transceiver module), while in some embodiments the transmitter modules and the receiver modules may each be implemented as dedicated independent modules.

The controller/processor module 520 is configured to manage various functions and operations related to light-based communication and/or RF communication, including decoding light-based communications, such as VLC signals. As shown, in some embodiments, the controller 520 may be in communication (e.g., directly or via the bus 510) with the memory storage device 522 which includes a codeword derivation module 550. As illustrated in FIG. 5, an image captured by the light-based communication receiver module 512 may be stored in the image buffer 562, and processing operations performed by the codeword derivation module 550 may be performed on the data of the captured image stored in the image buffer 562. In some embodiments, codeword derivation module 550 may be implemented as a hardware realization, a software realization (e.g., as processor-executable code stored on non-transitory storage medium such as volatile or non-volatile memory, which in FIG. 5 is depicted as the memory storage device 522), or as a hybrid hardware-software realization. The controller 520 may be implemented as a general processor-based realization, or as a customized processor realization, to execute the instructions stored on the memory storage device 522. In some embodiments, the controller 520 may be realized as an apps processor, a DSP processor, a modem processor, dedicated hardware logic, or any combination thereof. Where implemented, at least in part, based on software, each of the modules, depicted in FIG. 5 as being stored on the memory storage device 522, may be stored on a separate RAM memory module, a ROM memory module, an EEPROM memory module, a CD-ROM, a FLASH memory module, a Subscriber Identity Module (SIM) memory, or any other type of memory/storage device, implemented through any appropriate technology. The memory storage device 522 may also be implemented directly in hardware.

In some embodiments, the controller/processor 520 may also include a location determination engine/module 560 to determine a location of the device 500 or a location of a device that transmitted a light-based communication (e.g., a location of a light source such as the light source 236 and/or the light device 230 depicted in FIG. 2) based, for example, on a codeword (identifier) encoded in a light-based communication transmitted by the light source. For example, in such embodiments, each of the codewords of a codebook may be associated with a corresponding location (provided through data records, which may be maintained at a remote server, or be downloaded to the device 500, associating codewords with locations). In some examples, the location determination module 560 may be used to determine the locations of a plurality of devices (light sources and/or their respective fixtures) that transmit light-based communications, and determine the location of the device 500 based at least in part on the determined locations of the plurality of devices. For example, a possible position(s)/location(s) of the device may be determined from a plurality of possible position solutions that correspond to the identified light device(s). A particular decoded identifier or codeword may result in more than one possible position when, for example, the identifiers assigned to the various light devices are not unique, or when only a portion of an identifier/codeword transmitted by a light device can be determined and that decoded portion may be matched to a plurality of identifiers codewords (e.g., more than one codeword might include the decoded portion received by the mobile device). Although the problem of having only a portion of a decoded codeword (resulting in multiple possible codewords) may be mitigated, under some circumstances, through various decoding procedures (e.g., obtaining further samples), performing such decoding procedures may take too long as to be practical. As noted, in such embodiments, the position ambiguity resulting from having a plurality of possible position candidates may be resolved by obtaining position information from signals (e.g., received at another location of the mobile device, at an earlier or subsequent time instance), and eliminating from the possible candidate positions (at the first location) those candidates that are impractical given the position information obtained at the other location. For example, a candidate position whose distance to the position(s) at another location exceeds the maximum possible distance that could have been traveled by the devices between the device's actual two locations (at the two corresponding time instances) would be eliminated from further consideration. In some implementations, the location determination module 560 may obtain position information (e.g., in order to resolve position ambiguity resulting from location determination based on received light-based communication(s), or to otherwise derive the location approximation of the device 500) from various other receivers and modules of the mobile device 500, e.g., based on receive signal strength indication (RSSI) and round trip time (RTT) measurements performed using, for example, the radio frequency receiver and transmitter modules of the device 500, as well as based on angle of arrival of RF signals at the receiving device.

Figure 6A:
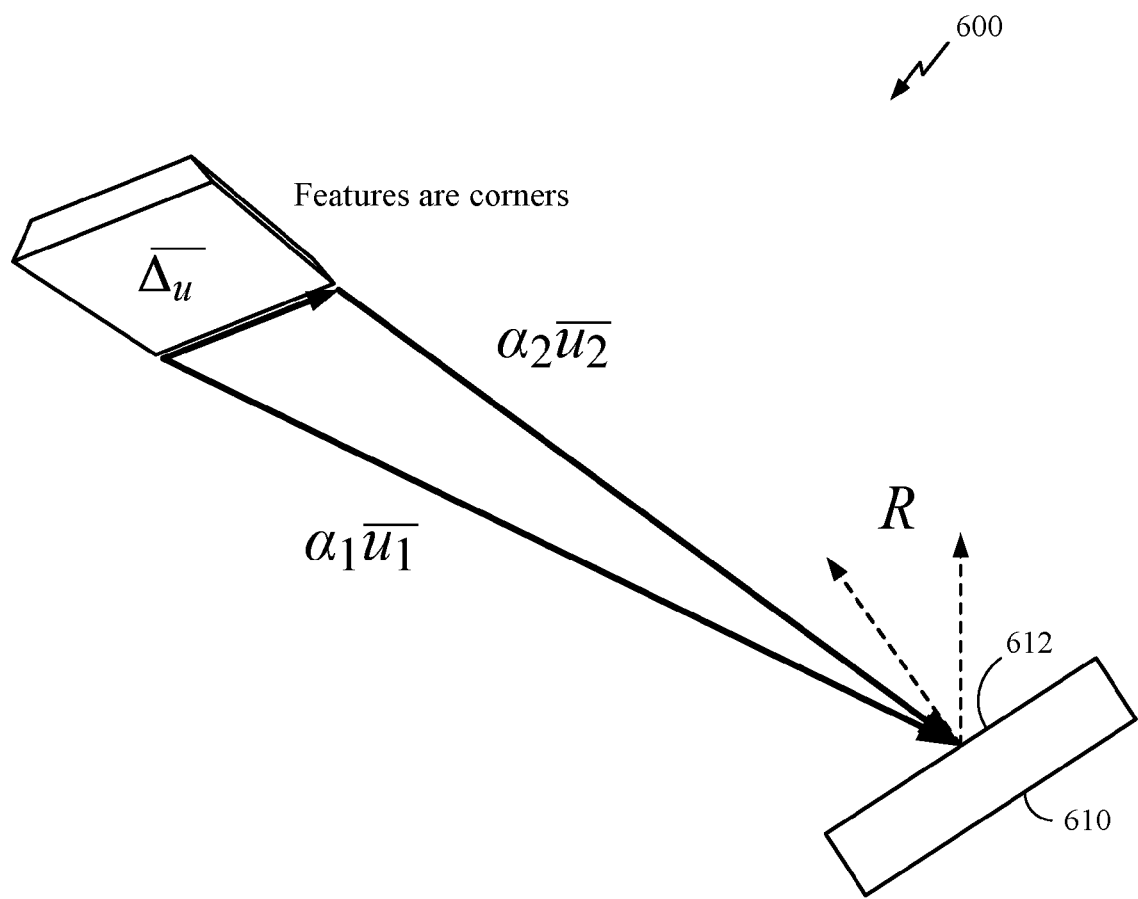
FIG. 6A is a diagram of a system to determine position of a device, in accordance with certain example implementations.

In some embodiments, location determination based on light-based communications (based on codewords/identifiers decoded from such light-based communications) may be based on physical features such as corners/edges of a light/device fixture to thus achieve 'cm' level accuracy in determining the position of the mobile device. For example, and with reference to FIG. 6A showing a diagram of an example system 600 to determine position of a device 610 (e.g., a mobile device which may be similar to the mobile devices 108, 220, 320, or 500 of FIGS. 1, 2, 3, and 5, respectively) that includes a light-capture device 612, consider a situation where an image is obtained from which two corners of a light source of the light device (e.g., a light device transmitting a light-based communication identifying that light device, with that light device being associated with a known position) are visible and are detected. In this situation, the direction of arrival of light rays corresponding to each of the identified corners of the light fixture are represented as a unit vector $u'_1$ and $u'_2$ in the device's coordinate system. In some embodiments, based on measurements from the mobile device's various sensors (e.g., measurements from an accelerometer, a gyroscope, a geomagnetic sensor, each of which may be part of the sensors 530 of the device 500 of FIG. 5), the tilt of the mobile device may be derived/measured, and based on that the rotation matrix R of the device's coordinate system around that of the earth may be derived. The position and orientation of the device may then be derived based on the known locations of the two identified features (e.g., corner features of the identified fixture) by solving for the parameters $\alpha_1$ and $\alpha_2$ in the relationship:

$$\alpha_1 u'_1 + \alpha_2 u'_2 = R^{-1} \Delta'_u,$$

where $\Delta'_u$ is the vector connecting the two known features. The determined location for the mobile device generally includes position coordinates (absolute or relative), as well as an orientation value (e.g., the azimuth or elevation angle) of the light-capture device with respect to the light device that transmitted the light-based communication. As noted, if a particular identifier is associated with two or more light devices, or if only part of the identifier is decoded and is matched to two or more identifiers of two or more light devices, there will be corresponding two or more light device positions associated with the identifier (or with the partial decoded identifier), and consequently there will be two resultant possible candidate positions that can be derived from the image obtained by the light-capture device 612.

Figure 6B:
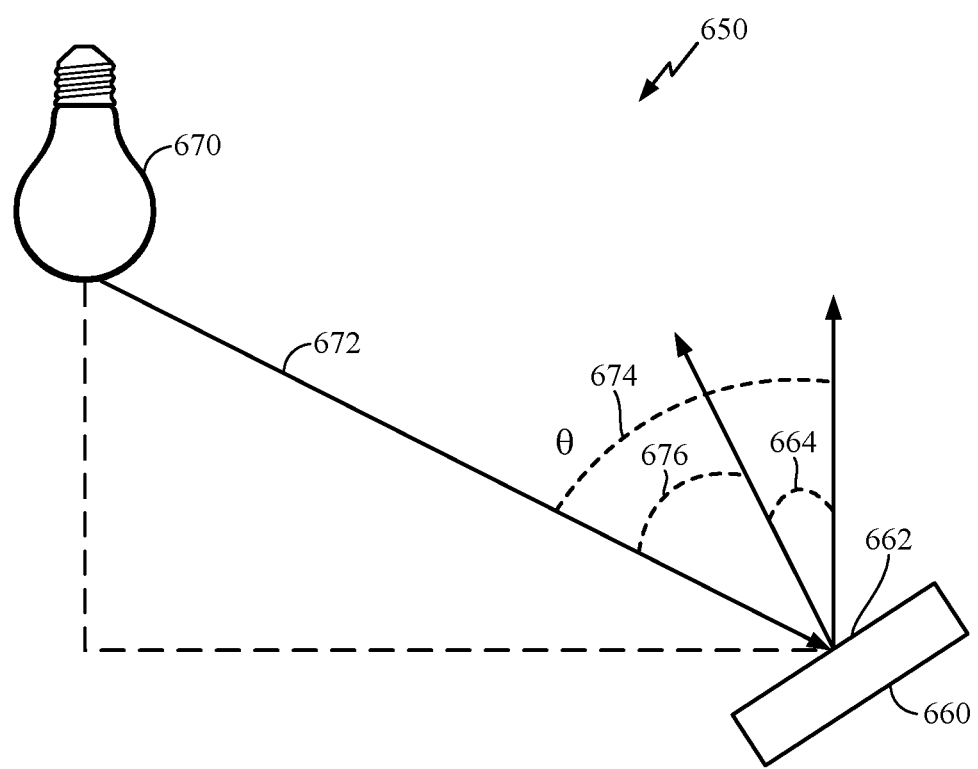
FIG. 6B is a diagram of a system to determine angle of arrival of a light signal, in accordance with certain example implementations.

In some embodiments, a location of the mobile device may be derived based on determination of a single angle of arrival of a light signal (e.g., corresponding to a light-based communication). Determination of a single angle of arrival may be required in situations where, for example, two or more distinct features of the emitting light device/fixture are not detectable/available (e.g., when the light device/fixture is too far away, when the light device/fixture does not have easily distinguishable features such as identifiable corner or edges, etc.) For example, and with reference to FIG. 6B showing a diagram of another example system 650 to determine an angle of arrival of a light signal and determine position of a device 660 (e.g., a mobile device which may be similar to the mobile devices 108, 220, 320, 500, or 610 of FIGS. 1, 2, 3, 5, and 6A respectively) based on the determined angle-of-arrival, consider a situation where modulated light emitted from a light source 670 arrives at some angle θ (marked 674) relative to some external frame-of-reference (e.g., the earth's frame-of-reference). As shown in FIG. 6B, the device 660 is tilted in some undetermined angle relative to that external frame-of-reference.

In some embodiments, determination of the angle of arrival of a light signal 672 from the light source 670 may include determining the relative angle of arrival of the signal 672 with respect to a coordinate system of the mobile device 660. The relative angle of arrival of the light signal 672 may be estimated, in some cases, by determining a position of an illuminated region captured by an image sensor (of a light-capture device 662) of the device 660 illuminated by the light source 670. The illuminated region may be defined as an array of pixels within the image sensor, and may in some cases be specified in terms of pixel indices. A centroid of the illuminated region (e.g., a location $(x_0, y_0)$), may be found relative to the image sensor's coordinate system, which may also be considered the coordinate system of the mobile device 660. The image sensor's coordinate system may be defined by a pair of axes centered at the midway pixel along the width and the length of the image sensor. For example, if the sensor is 480 pixels wide and 640 pixels long, then the coordinate axes are centered at the pixel index pair (240, 320). If the centroid of the identified region of the image is at pixel indices (250, 335) then the location of the region is given by $(x_0, y_0)=(10,15)$. In general, if the pixel indices are $(p_x, p_y)$ and the center of the sensor is at pixel indices $(c_x, c_y)$, the location of the region is $(x_0, y_0)=(p_x, p_y)-(c_x, c_y)$. A pair of angles $(\omega_x, \omega_y)$ may then be determined as a function of the centroid $(x_0, y_0)$. This pair of angles determines the angle of arrival of the light signal 672 received by the mobile device 660 (i.e., by the light-capture device 662 of the device 660), expressed in terms of the coordinate system of the mobile device 660, which is a three dimensional coordinate system where the axis perpendicular to the plane that the mobile device lies in is the Z-axis, and the X and Y axes span the plane that the mobile device lies in and coincide with the image sensor's coordinate axes. For example, if the half of the field of view (FOV) angle is denoted by $\theta_{half}$ and the screen resolution in pixels is denoted by $X_{res}$ by $Y_{res}$, then the mapping between the centroid $(x_0, y_0)$ and the relative angle of arrival $(\omega_x, \omega_y)$ of a light signal may be given by the equations:

$$\omega_x = \arctan\left(\frac{2x_0}{X_{res}} \tan(\theta_{half})\right)$$

$$\omega_y = \arctan\left(\frac{2y_0}{Y_{res}} \tan(\theta_{half})\right)$$

In some embodiments, measurements of an orientation of the mobile device 660 may be obtained from orientation sensors of the device 660 (e.g., a gyroscope, an accelerometer, etc.) Based on measurements obtained by the orientation sensors of the device 660, a pair of angles $(\theta_x, \theta_y)$ are derived which represent the angles of rotation (or orientation) of the mobile device 660 with respect to the reference (absolute) coordinate system. For example, if gyroscope or accelerometer sensors are used, the angles $(\theta_x, \theta_y)$ may represent the pitch and roll of the mobile device relative to the earth's coordinate system. The absolute angle of arrival (i.e., relative to the reference/external coordinate system) may thus be computed, in some cases, by adjusting the relative angle of arrival (marked with reference numeral 676) with the orientation angle as measured by a the orientation sensors of the device 660.

In some embodiments, the absolute angle of arrival may be determined by multiplying a unit vector, expressed relative to a coordinate system of the mobile device, by a rotation matrix to obtain a unit vector expressed relative to an absolute coordinate system (e.g., the earth's coordinate system). For example, a unit vector in the mobile device's coordinate system may be expressed as:

$$u_{device} = \frac{u_{device}}{|v|}$$

where $v=[\tan(\omega_x), \tan(\omega_y), 1]$, and $|v|=\tan(\omega_x)^2+\tan(\omega_y)^2+1$ This is unit vector, u, extends from the mobile device to the light source 670 expressed in the coordinate system of the mobile device, as defined above. From the unit vector (that is expressed in the coordinate system of the mobile device), a resultant unit vector that is expressed in an absolute coordinate system may be obtained. For example, the earth's coordinate system (an absolute coordinate system) may be defined by a Z axis that is parallel to the gravity vector, and X and Y axes that are in the plane of the earth's surface. The relative orientation of the X and Y axes in that plane may be arbitrary or be aligned with the earth's magnetic field. To convert the unit vector u from the coordinate system of the mobile device to the earth's coordinate system, the vector u may be multiplied by a rotation matrix. The rotation matrix may represent the rotation of the mobile device around some axis in the earth's coordinate system. For example, a rotation of the mobile device amounting to $\theta_x$ degrees around the Y axis of the earth's coordinate system (referred to as the roll) may be represented as $$R_Y(\theta_x) = \begin{bmatrix} 1 & 0 & 0 \\ 0 & \cos(\theta_x) & -\sin(\theta_x) \\ 0 & \sin(\theta_x) & \cos(\theta_x) \end{bmatrix}$$

The roll angle $\theta_x$ is illustrated in FIG. 6B as an angle 664. A rotation of $\theta_y$ degrees around the X axis of the earth's coordinate system (referred to as the pitch) may be represented as:

$$R_X(\theta_y) = \begin{bmatrix} \cos(\theta_y) & 0 & \sin(\theta_y) \\ 0 & 1 & 0 \\ -\sin(\theta_y) & 0 & \cos(\theta_y) \end{bmatrix}$$

The unit vector in the earth's coordinate system can then be expressed as:

$$u_{earth} = R_Y(\theta_x) R_X(\theta_y) u_{device}$$

Given the unit vector in the earth's coordinate system, $u_{earth}$, a vector from the light source 670 to the mobile device, $u_{earth}$, can be computed by scaling $u_{earth}$ so that the z-coordinate of the resulting vector is equal to the height of the light source from the mobile device. In other words, if $u_{earth}(z)$ is the z-coordinate of vector $u_{earth}$ and $d_z$ is the height, then the vector $u_{earth}$ may be written as:

$$v_{earth} = \frac{d_z u_{earth}}{u_{earth}(z)}$$

Thus, the position of the mobile device can be derived based on the computed angle of arrival of light signals (such as the signal 672) arriving from the light source/fixture 670, and the known position of the light source 670 (i.e., coordinates of the light source in the global frame of reference, such as the earth's global coordinate systems, including height of the light source). The light device's coordinates may be obtained based, in part, according to the decoded identifier derived from the data included in the modulated light signal received by the light-capture device 662 of the mobile device 660.

Turning back to FIG. 5, in some examples, the device 500 and/or the controller/processor module 520 may include a navigation module (not shown) that uses a determined location of the device 500 (e.g., as determined based on the known locations of one or more light sources/fixtures transmitting the VLC signals) to implement navigation functionality.

A light-based communication (such as a VLC signal) transmitted from a particular light source, is received by the light-based communication receiver module 512, which may be an image sensor with a gradual-exposure mechanism (e.g., a CMOS image sensor with a rolling shutter) configured to capture on a single frame time-dependent image data representative of a scene (a scene that includes one or more light sources transmitting light-based communications, such as VLC signals) over some predetermined interval (e.g., the captured scene may correspond to image data captured over ⅟30 second), such that different rows contain image data from the same scene but for different times during the pre-determined interval. As further noted, the captured image data may be stored in an image buffer which may be realized as a dedicated memory module of the light-based communication receiver module 512, or may be realized on the memory 522 of the device 500. A portion of the captured image will correspond to data representative of the light-based communication transmitted by the particular light source (e.g., the light source 236 of FIG. 2, with the light source comprising, for example, one or more LEDs) in the scene, with a size of that portion based on, for example, the distance and orientation of the light-based communication receiver module to the light source in the scene. In some situations, the part of the light-based communication may be captured at a low exposure setting of the light-based communication receiver module 512, so that high frequency pulses are not attenuated.

Having captured an image frame that includes time-dependent data from a scene including a particular light source (or multiple light sources), the codeword derivation module 550, for example, is configured to process the captured image frame to extract symbols encoded in the light-based communication occupying a portion of the captured image (as noted, the size of the portion will depend on the distance from the light source, and/or on the orientation of the light-based communication receiver module relative to the light source). The symbols extracted may represent at least a portion of the codeword (e.g., an identifier) encoded into the light-based communication, or may represent some other type of information. In some situations, the symbols extracted may include sequential (e.g., consecutive) symbols of the codeword, while in some situations the sequences of symbols may include at least two non-consecutive sub-sequences of the symbols from a single instance of the codeword, or may include symbol sub-sequences from two transmission frames (which may or may not be adjacent frames) of the light source (i.e., from separate instances of a repeating light-based communication).

As also illustrated in FIG. 5, the device 500 may further include a user interface 570 providing suitable interface systems, such as a microphone/speaker 572, a keypad 574, and a display 576 that allows user interaction with the device 500. The microphone/speaker 572 provides for voice communication services (e.g., using the wide area network and/or local area network receiver and transmitter modules). The keypad 574 may comprise suitable buttons for user input. The display 576 may include a suitable display, such as, for example, a backlit LCD display, and may further include a touch screen display for additional user input modes.

Figure 7:
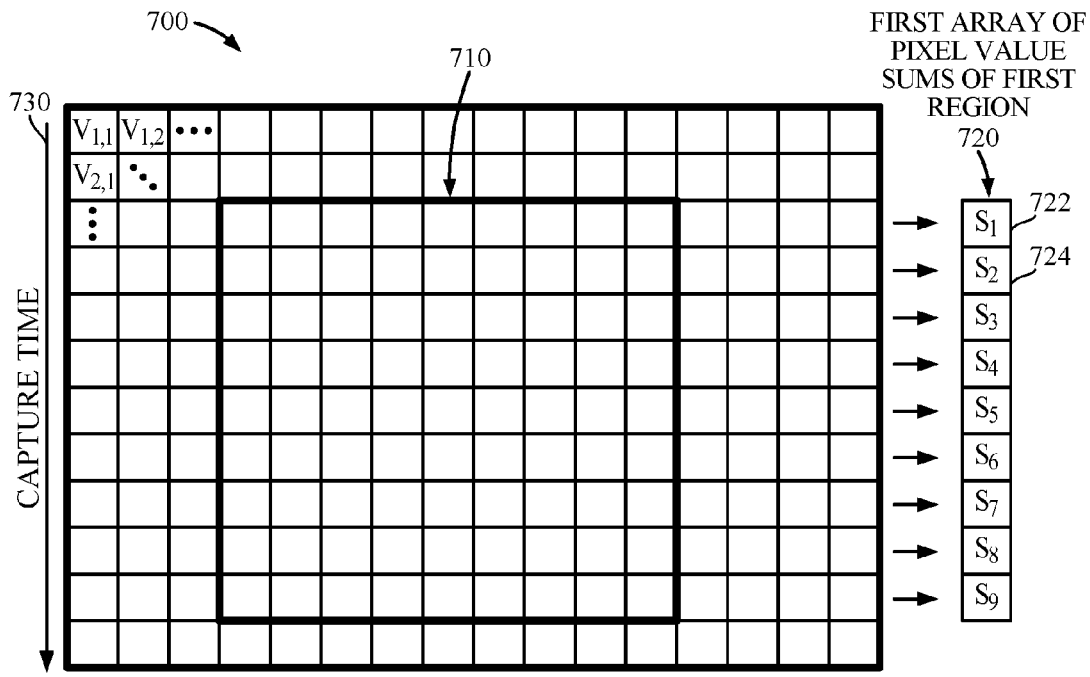
FIGS. 7-8 are illustrations of images, captured by a sensor array, that include regions of interest corresponding to a light-based communication transmitted by a light device, in accordance with certain example implementations.

In some embodiments, decoding the symbols from a light-based communication may include determining pixel brightness values from a region of interest in at least one image (the region of interest being a portion of the image corresponding to the light source illumination), and/or determining timing information associated with the decoded symbols. Determination of pixel values, based on which symbols encoded into the light-based communication (e.g., VLC signal) can be identified/decoded, is described in relation to FIG. 7 showing a diagram of an example image 700, captured by an image sensor array (such as that found in light-based communication receiver module 512), that includes a region of interest 710 corresponding to illumination from a light source. In the example illustration of FIG. 7, the image sensor captures an image using an image sensor array of 192 pixels which is represented by 12 rows and 16 columns. Other implementations may use any other image sensor array size (e.g., 307,200 pixels, represented by 480 rows and 640 columns), depending on the desired resolution and on cost considerations. As shown, the region of interest 710 in the example image 700 is visible during a first frame time. In some embodiments, the region of interest may be identified/detected using image processing techniques (e.g., edge detection processes) to identify areas in the captured image frame with particular characteristics, e.g., a rectangular area with rows of pixels of substantially uniform values. For the identified region of interest 710, an array 720 of pixel sum values is generated. Vertical axis 730 corresponds to capture time; and the rolling shutter implementation in the light-capture device results in different rows of pixels corresponding to different times.

Each pixel in the image 700 captured by the image sensor array includes a pixel value representing energy recovered corresponding to that pixel during exposure. For example, the pixel of row 1 and column 1 has pixel value $V_{1,1}$. As noted, the region of interest 710 is an identified region of the image 700 in which the light-based communication is visible during the first frame. In some embodiments, the region of interest is identified based on comparing individual pixel values, e.g., an individual pixel luma value, to a threshold and identifying pixels with values which exceed the threshold, e.g., in a contiguous rectangular region in the image sensor. In some embodiments, the threshold may be 50% the average luma value of the image 700. In some embodiments, the threshold may be dynamically adjusted, e.g., in response to a failure to identify a first region or a failure to successfully decode information being communicated by a light-based communication in the region 710.

The pixel sum values array 720 is populated with values corresponding to sum of pixel values in each row of the identified region of interest 710. Each element of the array 720 may correspond to a different row of the region of interest 710. For example, array element $S_1$ 722 represents the sum of pixel values (in the example image 700) of the first row of the region of interest 710 (which is the third row of the image 700), and thus includes the value that is the sum of $V_{3,4}$, $V_{3,5}$, $V_{3,6}$, $V_{3,7}$, $V_{3,8}$, $V_{3,9}$, $V_{3,10}$, $V_{3,11}$, and $V_{3,12}$. Similarly, the array element $S_2$ 724 represents the sum of pixel values of the second row of the region of interest 710 (which is row 4 of the image 700) of $V_{4,4}$, $V_{4,5}$, $V_{4,6}$, $V_{4,7}$, $V_{4,8}$, $V_{4,9}$, $V_{4,10}$, $V_{4,11}$, and $V_{4,12}$.

Array element 722 and array element 724 correspond to different sample times as the rolling shutter advances. The array 720 is used to recover a light-based communication (e.g., VLC signal) being communicated. In some embodiments, the VLC signal being communicated is a signal tone, e.g., one particular frequency in a set of predetermined alternative frequencies, during the first frame, and the single tone corresponds to a particular bit pattern in accordance with known predetermined tone-to-symbol mapping information.

Figure 8:
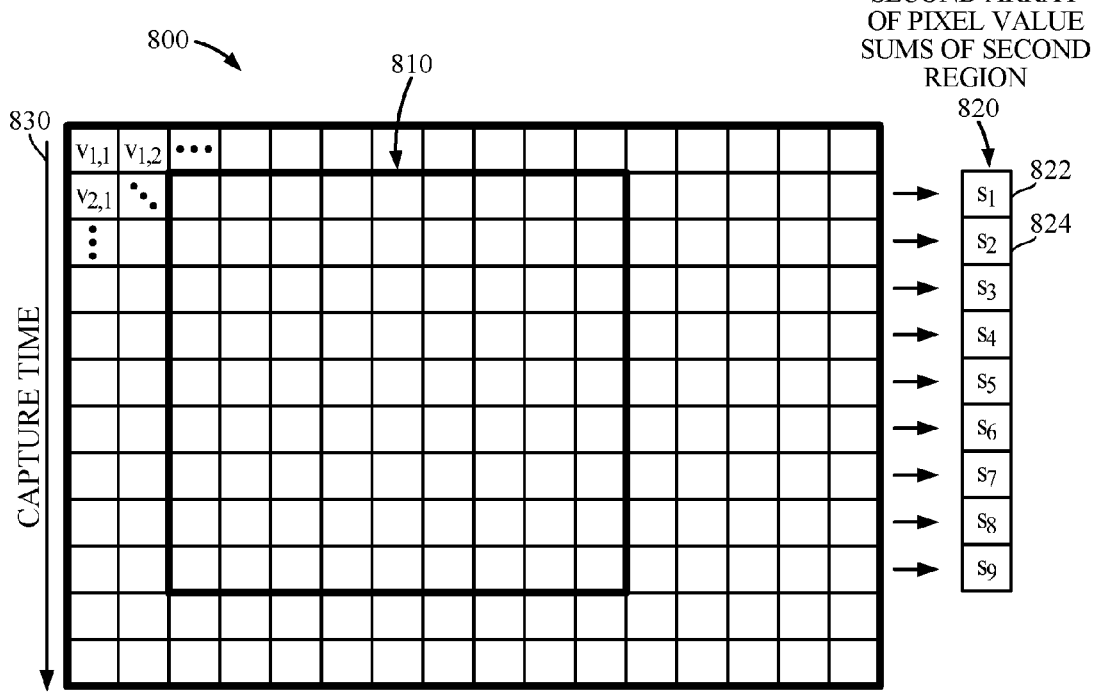

FIG. 8 is a diagram of another example image 800 captured by the same image sensor (which may be part of the light-based communication receiver module 512) that captured the image 700 of FIG. 7, but at a subsequent time interval to the time interval during which image 700 was captured by the image sensor array. The image 800 includes an identified region of interest 810 in which the light-based communication (e.g., VLC signal) is visible during the second frame time interval, and a corresponding generated array of pixel sum values 820 to sum the pixel values in the rows of the identified region of interest 810. As noted, in situations in which a light-capture device of a moving mobile device (such as a mobile phone) is used to capture the particular light device(s), the dimensions of the region of interests in each of the captured frames may vary as the mobile device changes its distance from the light source and/or changes its orientation relative to the light source. As can be seen in the example captured image 800 of FIG. 8, the region of interest 810 is closer to the top left corner of the image 800 than the region of interest 710 was to the top left corner of the image 700. The difference in the position of the identified regions of interest 710 and 810, respectively, with reference to the images 700 and 800, may have been the result of a change in the orientation of the mobile device from the time at which the image 700 was being captured and the time at which the image 800 was being captured (e.g., the mobile device, and thus its image sensor, may have moved a bit to the right and down, relative to the light source, thus causing the image of the light source to be closer to the top left corner of the image 800). In some embodiments, the size of first region of interest 710 may be different than the size of the second region of interest 810.

In FIG. 8, a vertical axis 830 corresponds to capture time, and the rolling shutter implementation in the camera results in different rows of pixels corresponding to different times. Here too, the image 800 may have been captured by an image sensor that includes the array of 192 pixels (i.e., the array that was used to capture the image 700), which can be represented by 12 rows and 16 columns.

Each pixel in the image 800 captured by the image sensor array has a pixel value representing energy recovered corresponding to that pixel during exposure. For example, the pixel of row 1, column 1, has pixel value $v_{1,1}$. A region of interest block 810 is an identified region in which the VLC signal is visible during the second frame time interval. As with the image 700, in some embodiments, the region of interest may be identified based on comparing individual pixel values to a threshold, and identifying pixels with values which exceed the threshold, e.g., in a contiguous rectangular region in the captured image.

An array 820 of pixel value sums for the region of interest 810 of the image 800 is maintained. Each element of the array 820 corresponds to a different row of the region of interest 810. For example, array element $s_1$ 822 represents the sum of pixel values $v_{2,3}$, $v_{2,4}$, $v_{2,5}$, $v_{2,6}$, $v_{2,7}$, $v_{2,8}$, $v_{2,9}$, $v_{2,10}$, and $v_{2,11}$; while array element $s_2$ 824 represents the sum of pixel values $v_{3,3}$, $v_{3,4}$; $v_{3,5}$; $v_{3,6}$; $v_{3,7}$, $v_{3,8}$, $v_{3,9}$, $v_{3,10}$, and $v_{3,11}$. The array element 822 and the array element 824 correspond to different sample times as the rolling shutter (or some other gradual-exposure mechanism) advances.

Decoded symbols encoded into a light-based communication captured by the light-capture device (and appearing in the region of interest of the captured image) may be determined based, in some embodiments, on the computed values of the sum of pixel values (as provided by, for example, the arrays 720 and 820 shown in FIGS. 7 and 8 respectively). For example, the computed sum values of each row of the region of interest may be compared to some threshold value, and in response to a determination that the sum value exceeds the threshold value (or that the sum is within some range of values), the particular row may be deemed to correspond to part of a pulse of a symbol. In some embodiments, the pulse's timing information, e.g., its duration (which, in some embodiments, would be associated with one of the symbols, and thus can be used to decode/identify the symbols from the captured images) may also be determined and recorded. A determination that a particular pulse has ended may be made if there is a drop (e.g., exceeding some threshold) in the pixel sum value from one row to another. Additionally, in some embodiments, a pulse may be determined to have ended only if there are a certain number of consecutive rows (e.g., 2, 3 or more), following a row with a pixel sum that indicates the row is part of a pulse, that are below a non-pulse threshold (that threshold may be different from the threshold, or value range, used to determine that a row is part of a pulse). The number of consecutive rows required to determine that the current pulse has ended may be based on the size of the region of interest. For example, small regions of interest (in situations where the mobile device may be relatively far from the light source) may require fewer consecutive rows below the non-pulse threshold, than the number of rows required for a larger region of interest, in order to determine that the current pulse in the light-based communication signal has ended.

Having decoded one or more symbol sub-sequences for the particular codeword, in some embodiments, the codeword derivation module 550 is applied to the one or more decoded symbols in order to determine/identify codewords. The decoding procedures implemented depend on the particular coding scheme used to encode data in the light-based communication. Examples of some coding/decoding procedures that may be implemented and used in conjunction with the systems, devices, methods, and other implementations described herein include, for example, the procedures described in U.S. application Ser. No. 14/832,259, entitled "Coherent Decoding of Visible Light Communication (VLC) Signals," or U.S. application Ser. No. 14/339,170 entitled "Derivation of an Identifier Encoded in a Visible Light Communication Signal," the contents of which are hereby incorporated by reference in their entireties. Various other coding/decoding implementations for light-based communications may also be used.

Figure 9:
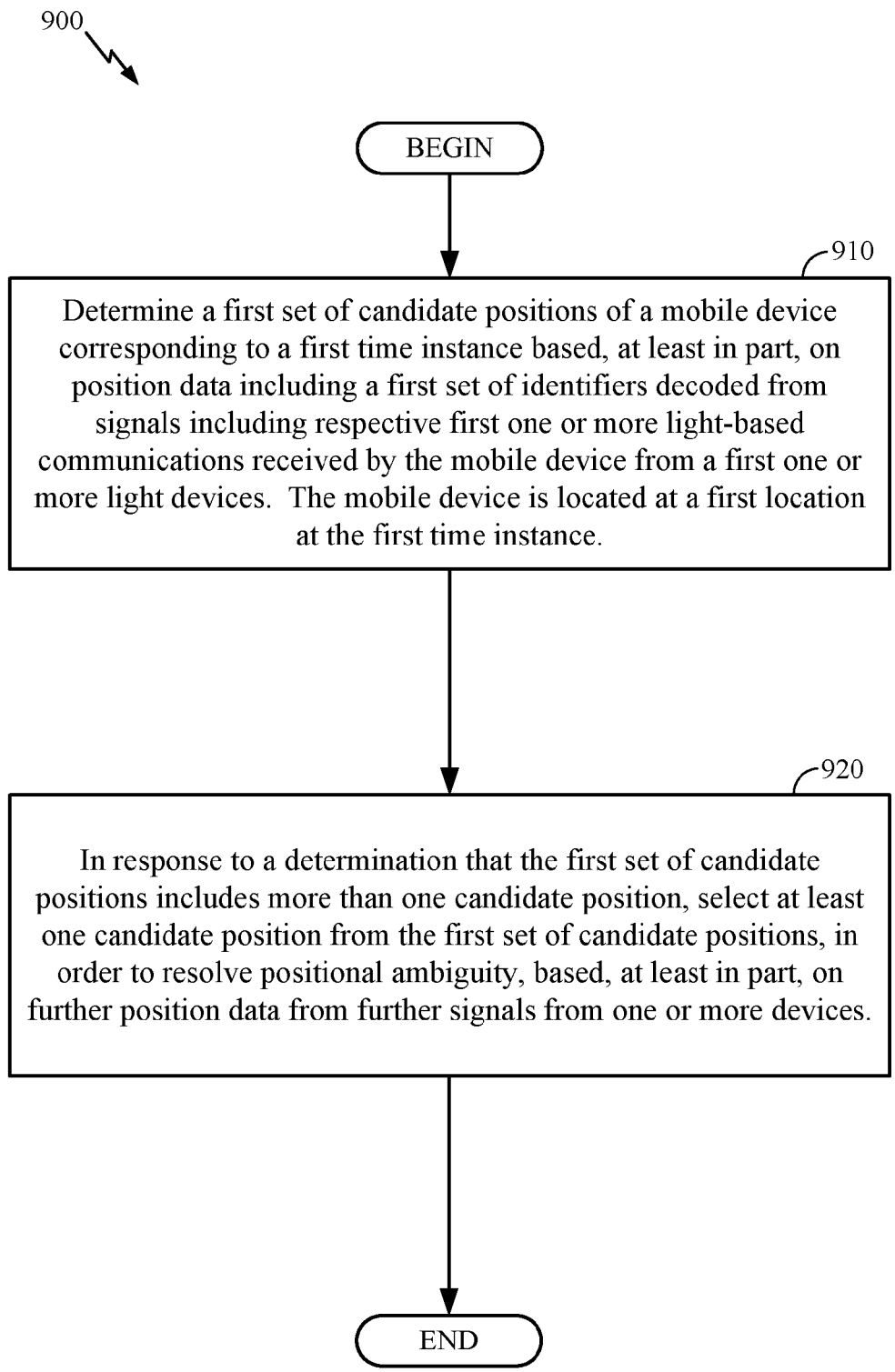
FIG. 9 is a flowchart of a procedure to determine location of a mobile device based, at least in part, on light-based communication(s) received from one or more light devices, in accordance with certain example implementations.

With reference now to FIG. 9, a flowchart of an example procedure 900 to determine location of a processor-based mobile device (such as the mobile devices 108, 220, 320, or 500 of FIG. 1, 2, 3, or 5) based, at least in part, on light-based communication(s) received from one or more light devices (such as the light devices 120a-b, 230, or 330a-f of FIGS. 1-3) is shown. The example procedure 900 is generally performed at the processor-based mobile device and includes determining at block 910 a first set of candidate positions of the mobile device corresponding to a first time instance based, at least in part, on position data including a first set of identifiers decoded from signals including respective first one or more light-based communications received by the mobile device from a first one or more light devices (e.g., the first set of identifiers may include just a single identifier, or may include multiple identifiers from multiple light devices). The mobile device is located at a first location at the first time instance. As noted, at the first location (e.g., at the location $L(T_1)$ illustrated in FIG. 1), the mobile device may receive light-based communications from one or more light devices that include encoded codewords/identifier to, in some embodiments, identify the transmitting light devices. The identified one or more light devices light devices may each be associated with a known position (data associating identifiers with known light device positions may have been downloaded and stored on the mobile device at some earlier time), and thus the location of the mobile device (e.g., coordinates and orientation, such as an elevation angle) of the mobile device may be determined (such determination may be performed locally at the mobile device, or at a remote server, such as the server 110 of FIG. 1). Determining the location (or an approximation thereof) of the mobile device based on received light-based communications may be performed, for example, in accordance with processes such as the process illustrated in FIGS. 6A and/or 6B. The light-based communication(s) received by the mobile device at the first time instance may include respective one(s) of visual light communication (VLC) signal(s). Data encoded in a VLC signal may be decoded by capturing (e.g., using a light-capture device or a light-based communication receiver module) a corresponding at least part of at least one image of a scene that includes a corresponding at least one light source emitting a corresponding VLC signal, identifying from the captured corresponding at least part of the at least one image a corresponding time-domain signal representative of one or more symbols comprising a corresponding VLC codeword encoded in the corresponding VLC signal, and determining, at least in part, the corresponding VLC codeword from the time-domain signal identified from the captured at least part of the at least one image. The light-capture device (the light-based communication receiver module) may include a digital camera (e.g., CMOS camera) with a gradual-exposure mechanism (e.g., a rolling shutter).

With continued reference to FIG. 9, in response to a determination that the first set of candidate positions includes more than one candidate position, in order to resolve positional ambiguity at least one candidate position from the first set of candidate positions is selected, at block 920, based, at least in part, on further position data from further signals from one or more devices. For example, in some embodiments, the further position data (e.g., including known locations of transmitting devices, angles of arrival for signals detected by the receiving mobile device, etc.) for the mobile device may be determined based on radio signals from one or more remote wireless devices (e.g., Bluetooth® wireless technology devices, WiFi access points, WLAN base stations, etc.) received by the mobile device, and/or based on light-based communications. A coarse or exact location of the mobile device, based on RF signals received by the mobile device, may be derived using, for example, multilateration techniques. For example, the device's position may be determined using RSSI or RTT parameters (e.g., measured through an RSSI and/or an RTT modules implemented at the mobile device) associated with received RF signals from one or more remote transmitters, and based on the known locations of the remote transmitters, to determine the position of the mobile device. In another example, the mobile device's location/position may be determined based on signal profile identification techniques (also referred to as heatmaps or fingerprinting techniques), e.g., by comparing determined parameter values of, for example, RSSI and/or RTT, to stored profiles that are associated with pre-determined positions. As noted, in some embodiments, location determination may be based on both the light-based communications and RF signals received by the mobile device. For example, a decoded codeword (which may be part of, or the entirety, of the codeword encoded in a light-based communication) may correspond to several different positions. The mobile device may, under such circumstances, eliminate at least some of those possible positions that lie outside a communication range for a wireless node (transmitting according to near-field or far-field communication technologies) from which the mobile device received a transmission at the first time instance.

In some embodiments, selecting the at least one candidate position from the first set of candidate positions may include selecting the at least one candidate position based on a distance between the at least one candidate position for the mobile device and another location of the mobile device at another time instance. In such embodiments, the further position data may include position data for the other location of the mobile device based on signals from one or more devices received at the other location of the mobile device. For example, the signals received by the mobile device at the other time instance may be further light-based communication signals and/or RF signals (from one or more remote wireless devices/nodes). In some embodiments, the other time instance may be an earlier time instance than the first time instance, or may be a later (i.e., subsequent time instance). For example, in FIG. 1, the second location, $L(T_2)$ is shown as the location of the mobile device 108 at a time $T_2$ that is subsequent to the time $T_1$.

The distance between the mobile device's various possible positions (at the first time instance) and the other location (at the other time instance, which may be earlier than, or subsequent to, the first time instance) may be used to select at least one of the first one or more candidate positions (and thus to resolve, or at least reduce, the positional ambiguity of the mobile device). The distance may be an actual or approximate distance traveled during the time interval (i.e., between the first time instance and the other time instance). Such an actual/approximate distance may be determined by computing the product of a speed value for the mobile device and the time interval length between the first time instance and the other time instance.

In some embodiments, the speed value used may be an actual speed approximation for the mobile device computed based on measurements by inertial sensors of the mobile device. Alternatively, the speed value used may be some maximum speed value (e.g., maximum walking or running speed of a person), and thus the distance computed may be a maximum distance. Where a distance value is used to resolve positional ambiguity, selecting the at least one candidate position (from multiple candidate positions) may include eliminating another at least one candidate position from the first set of candidate positions (corresponding to the first time instance/first location of the mobile device) that is located at a computed distance from the other location of the mobile device exceeding the distance value (e.g., the maximum distance).

Figure 10A:
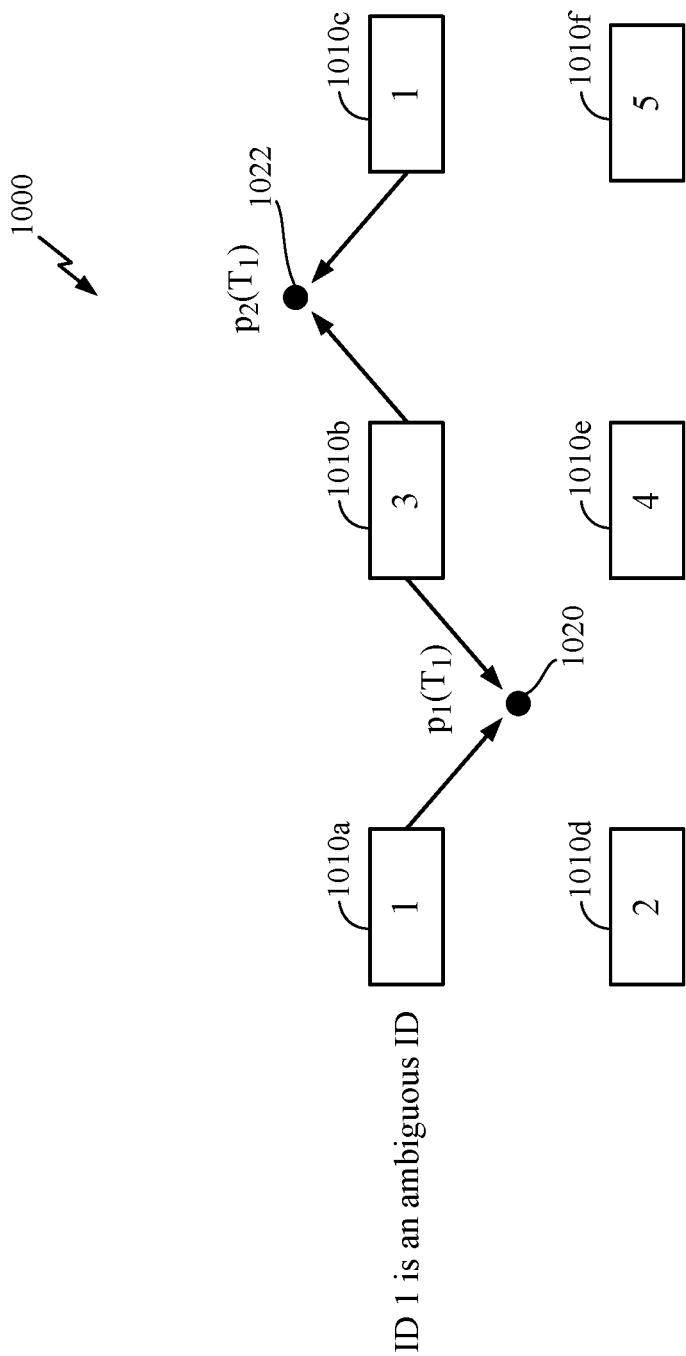
FIGS. 10A-B are diagrams illustrating a process to determine location of a device based on signals received from at least some light-based and/or RF transmitting devices, in accordance with certain example implementations.

To illustrate, consider an example shown in FIG. 10A, showing a diagram of an example system 1000 that includes a mobile device (not shown in FIG. 10A, but which may be similar, in configuration and/or functionality, to the mobile devices 108, 220, 320, and 500 of FIGS. 1, 2, 3, and 5) whose location in an area that includes six devices 1010a-f (that are each associated with an ID and/or with a known locations) is to be determined. Assume that, in this example, the mobile device received a light-based communication from one or more light devices such as the devices 1010a-c (which may be similar to the light devices 120a-b, 230, or 330a-f of FIGS. 1-3), but that due to non-uniqueness of the decoded identifiers, or incomplete decoded identifier(s) matching multiple identifiers, or due to ambiguity in the derivation of a position based on the captured image of the light devices and the codewords decoded therefor (or due to some other reason resulting in positional ambiguity), both the light devices 1010a and 1010c are determined as the possible transmitters that transmitted an ambiguous identifier codeword, and thus two different possible candidate positions, $p_1(T_1)$ (position 1020) and $p_2(T_1)$ (position 1022), are computed (the possible candidate positions for light devices transmitting the ambiguous identifier/codeword may have been derived using a procedure such as those implemented by the systems 600 or 650 depicted in FIGS. 6A and/or 6B). It is to be noted that at least one of the devices involved in the example of FIG. 10 (e.g., the device 1010b) may not necessarily be a light device, but may be instead a wireless transmitter/node.

Figure 10B:
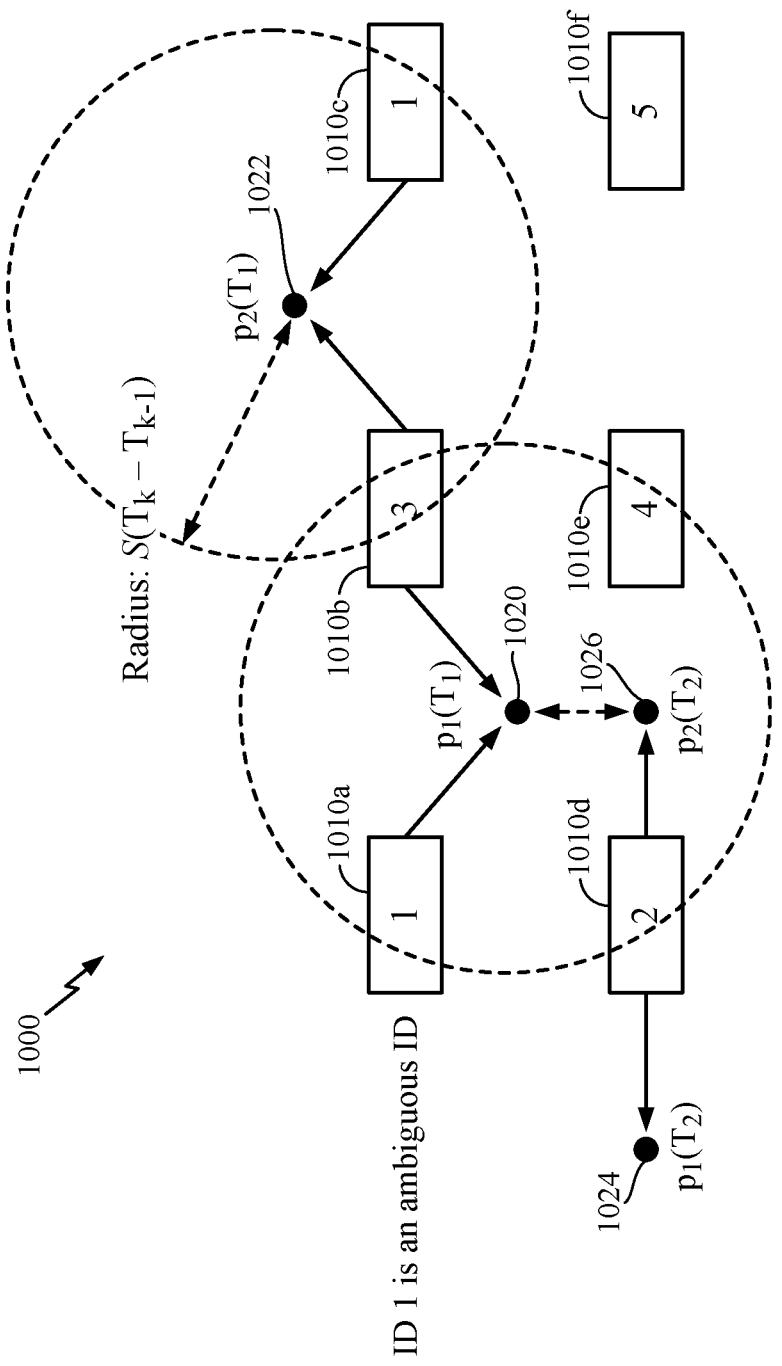

To resolve the resultant positional ambiguity, the mobile device may receive additional signals (RF or light-based) that may be used to eliminate at least one of the possible candidate positions. Assume, however, that in this example the positional ambiguity at the mobile device's first location cannot be further resolved based on additional signals received at that location (at approximately the same time instance). Accordingly, signals (RF and/or light-based) received by the mobile device at another time (earlier or later than the time instance at which the possible positions $p_1(T_1)$ and $p_2(T_1)$ were derived) may be used to resolve the positional ambiguity. Particularly, with reference to FIG. 10B, a diagram of the example system 1000 at a later time instance ($T_2$) is shown. In the example of FIG. 10B, the mobile device travels to a new location, for which two possible positions are derived, namely $P_1(T_2)$ (position 1024) and $P_2(T_2)$ (position 1026). The two possible positions may have been derived based on RF signals, light-based signals, or some combination thereof. For example, the mobile device may have been able to detect light-based signals from the light device 1010d (corresponding to an identifier of ID 2), and based on the known location of the light device 1010d, the two possible positions $p_1(T_2)$ and $p_2(T_2)$ are derived. It is to be noted that at least some of the light-based communications may be transmitted from light devices from which the mobile device received communication(s) at $T_1$. The existence of multiple possible solutions at $T_2$ may stem, for example, from possible symmetry of the light device. Particularly, absent additional information, observing only one fixture that has rotational symmetries may not yield a unique position estimate. For example a rectangular light fixture may yield two position candidates because it can be rotated by 180 degrees and the resultant captured image would be the same for either rotational positions (a square fixture may yield four possible position candidates because it can be rotated by multiples of 90 degrees, and the resultant images for each rotated 90 degree version of the fixture may be the same).

Having determined (in the present example) two possible position solutions for the mobile device at the time $T_2$, at least one possible position candidate from the earlier time $T_1$, as well as at least one candidate position at the time instance $T_2$, can be eliminated. Particularly, in the example of FIG. 10B, a maximum speed S (which may have been previously assigned to the mobile device) is assumed. That maximum speed may be the maximum speed that a person can travel by foot (e.g., a running speed). Alternatively, as noted, in some embodiments, an actual or approximate speed for the mobile device may be derived based, for example, on sensor measurements (e.g., by inertial sensors) obtained by sensors of the mobile device. A distance value (in this example, a maximum distance) can then be computed as the product of the time interval between $T_1$ and $T_2$ to obtain a maximum distance of $S(T_2-T_1)$. This maximum distance value can be represented as a maximum distance radius extending from each of the possible solutions (i.e., candidate positions) at the first time instance $T_1$, and any of the possible candidate position solutions corresponding to $T_2$ falling outside the circles, defined by the maximum distance radius, extending from the candidate positions at $T_1$, can therefore be eliminated as possible solutions. As can be seen in the example of FIG. 10B, only the position $p_2(T_2)$ (the position 1026) falls within a circle (of two circles extending respectively from the positions 1020 and 1022) with a radius corresponding to the maximum distance traveled by the mobile device, so that:

$$|p_1(T_1)-p_2(T_2)|<S(T_2-T_1)$$

Thus, in the example of FIGS. 10A-B, the positions of the mobile device at the time $T_1$ and $T_2$ are determined to be $p_1(T_1)$ and $p_2(T_2)$ (shown as the points 1020 and 1026).

Figure 11:
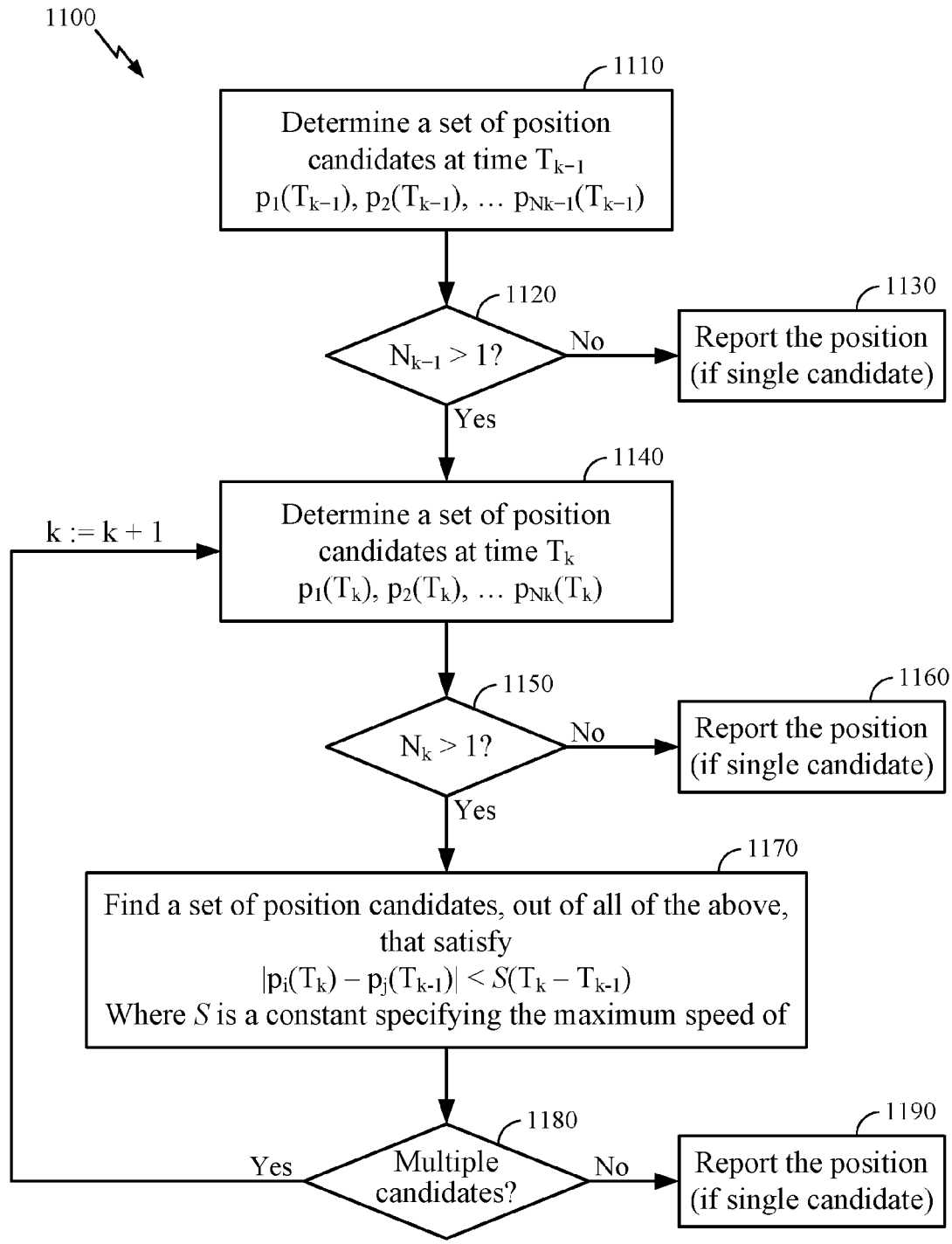
FIG. 11 is a flowchart of a process to determine position of a mobile device, in accordance with certain example implementations.

With reference now to FIG. 11, a flowchart of an example embodiment of a process 1100 to determine position of a mobile device (e.g., such a process may be a more particular implementation of the process 900 of FIG. 9) is shown. The process 1100 may be an implementation similar to that used to determine the positions $p_1(T_1)$ and $p_2(T_2)$ as the respective positions of the mobile device of the example of FIGS. 10A-B at the time instances $T_1$ and $T_2$. As shown, a time $T_{k-1}$ a set of position candidates (represented as $p_1(T_{k-1})$, $p_2(T_{k-1})$, ... $p_{Nk-1}(T_{k-1})$) is determined at block 1110. As noted, in some embodiments, the determination of position candidate may be based, at least in part, on light-based communication(s) received from one or more light sources viewable from the mobile device. Deriving a position candidate based on a light-based communications may include decoding the light-based communication to obtain the full or a partial codeword/identifier that may be associated with a known position for the transmitting device from which the light-based communication was received, and processing an image of a scene (e.g., in a manner similar to that shown in relation to FIGS. 6A and/or 6B) that includes the transmitting device (in which features of the transmitting device may appear) to determine a possible position (e.g., coordinates and/or relative orientation of the transmitting device to the receiving device).

If it is determined, at decision block 1120, that there is only a single candidate solution resulting from the determination of possible position candidates at the block 1110 (i.e., there is no positional ambiguity), then the single determined position is reported at block 1130. However, if it is determined (at the block 1120) that there is more than one position candidate (e.g., due to non-uniqueness of identifiers for the various light devices or for the other devices, due to ambiguity resulting from an incomplete decoded identifier that matches to multiple possible identifiers and thus to multiple possible positions, etc.), then, at block 1140, another set of position candidates, represented as $p_1(T_k)$, $p_2(T_k)$, ... $p_{Nk}(T_k)$), is determined, e.g., at a later time $T_k$. The candidate positions may be determined based on signals received from various wireless devices/nodes (e.g., Bluetooth® wireless technology devices, WLAN access points, WWAN base stations, etc.), based on light-based communications received from one or more light devices (including, in some embodiments, light-based communication(s) from at least one light device from which the mobile device received a communication at $T_{k-1}$), etc.

Next, if it is determined at block 1150, that there is only one possible position candidate, then no positional ambiguity for the receiving device (e.g., the mobile device) is deemed to exist at the time $T_k$, and thus the single position candidate is reported at block 1160 as the receiving device's position. However, if there is more than one position candidate, then processing to select at least one candidate position (e.g., from the position candidates determined at the time $T_k$ and/or at the time $T_{k-1}$) based on, for example, a distance value, may be performed at block 1170. For example, a speed value (such as a maximum speed value, S, assigned or imputed to the mobile device) may be used to compute a traveled distance (a maximum distance traveled, if a maximum speed value is used) according to $S(T_k - T_{k-1})$. In some embodiments, for each pair of position candidates, with one position of a given pair taken from the set of position candidates determined at the time $T_k$ and another position (of the given pair) taken from the set of position candidates determined at the time $T_{k-1}$, the distance between the two positions forming the pair is computed and compared to the computed distance traveled (e.g., the maximum distance traveled in the example embodiments of FIG. 11) to select those position pairs that are within the radius defined by computed distance traveled. Thus, for each candidate position pair, the position pairs that satisfy:

$$|p_i(T_k) - p_j(T_{k-1})| < S(T_k - T_{k-1})$$

are identified and selected for further processing. In the example of FIG. 10B, four (4) position pairs, namely, the pairs defined by the positions 1024 and 1020, 1026 and 1020, 1024 and 1022, and 1026 and 1022, need to be checked to determine if they satisfy the maximum distance traveled constraint.

Once the various position pairs are checked to compare their respective distances to the travel distance value for the mobile device, a determination is made at block 1180 whether more than one candidate pair exists. If only one candidate pair exists, the position of the present location (and/or the position of the mobile device at the other time instance) are reported at block 1190. In the example of FIG. 10B, the distance-based computations resulted in only one feasible position pair (corresponding to the points 1026 and 1020), and thus, in that example, the process 1100 ends with the reporting of the current position (i.e., the position 1026) and/or the previous position (e.g., the position 1020).

If, however, the distance-based computation does not completely resolve any positional ambiguity (e.g., there is more than one candidate position pair), further measurements, e.g., to determine further position candidates and perform distance-based computations therefor, need to be performed. Accordingly, in response to a determination that there is more than one candidate position pair, a new set of position candidates at time instance $T_{k+1}$ is performed (at the block 1140), and the operations in the blocks 1150-1190 are performed for those new position candidates. The new set of position candidates may be determined based on further one or more RF signals from further one or more wireless devices, further one or one or more light-based communications from light device(s), or any combination thereof.

Figure 12:
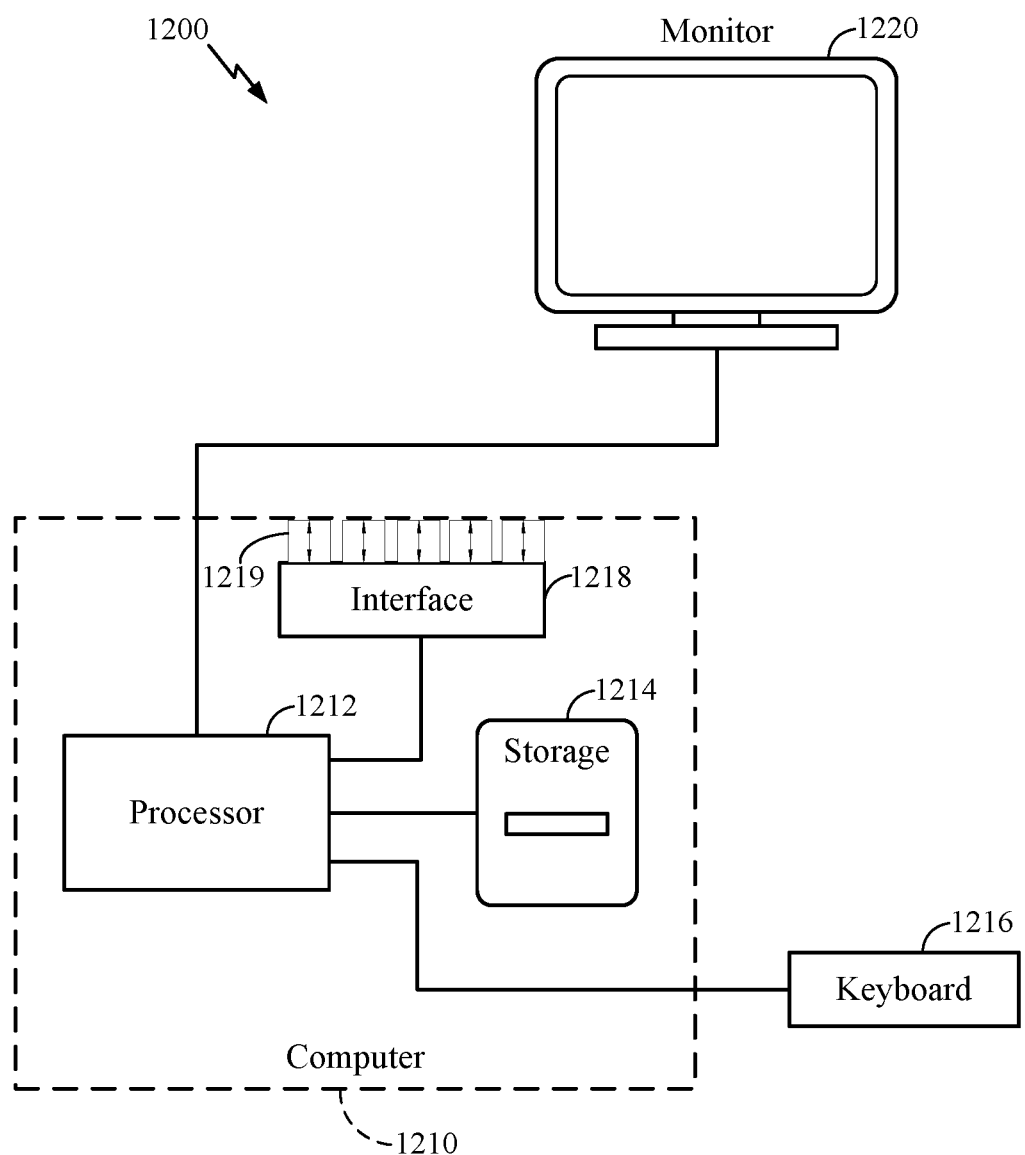
FIG. 12 is a schematic diagram of a computing system, in accordance with certain example implementations.

Performing the procedures described herein may be facilitated by a processor-based computing system. With reference to FIG. 12, a schematic diagram of an example computing system 1200 is shown. Part or all of the computing system 1200 may be housed in, for example, a handheld mobile device such as the devices 108, 220, 320, and 500 of FIGS. 1, 2, 3, and 5, respectively, or may comprise part or all of the servers, nodes, access points, or base stations described herein, including the light devices 120*a*-*b*, and/or the nodes 104*a*-*c* and 106*a*-*d*, depicted in FIG. 1. The computing system 1200 includes a computing-based device 1210 such as a personal computer, a specialized computing device, a controller, and so forth, that typically includes a central processor unit 1212. In addition to the CPU 1212, the system includes main memory, cache memory and bus interface circuits (not shown). The computing-based device 1210 may include a mass storage device 1214, such as a hard drive and/or a flash drive associated with the computer system. The computing system 1200 may further include a keyboard, or keypad, 1216, and a monitor 1220, e.g., a CRT (cathode ray tube) or LCD (liquid crystal display) monitor, that may be placed where a user can access them (e.g., a mobile device's screen).

The computing-based device 1210 is configured to facilitate, for example, the implementation of one or more of the procedures/processes/techniques described herein (including the procedures to determine a first set of candidate positions and select at least one candidate position from the candidate positions). The mass storage device 1214 may thus include a computer program product that when executed on the computing-based device 1210 causes the computing-based device to perform operations to facilitate the implementation of the procedures described herein. The computing-based device may further include peripheral devices to provide input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. For example, as illustrated in FIG. 12, the computing-based device 1210 may include an interface 1218 with one or more interfacing circuits (e.g., a wireless port that include transceiver circuitry, a network port with circuitry to interface with one or more network device, etc.) to provide/implement communication with remote devices (e.g., so that a wireless device, such as the device 220 of FIG. 2, could communicate, via a port such as the port 1219, with a controller such as the controller 210 of FIG. 2, or with some other remote device). Alternatively and/or additionally, in some embodiments, special purpose logic circuitry, e.g., an FPGA (field programmable gate array), a DSP processor, or an ASIC (application-specific integrated circuit) may be used in the implementation of the computing system 1200. Other modules that may be included with the computing-based device 1210 are speakers, a sound card, a pointing device, e.g., a mouse or a trackball, by which the user can provide input to the computing system 1200. The computing-based device 1210 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the computing-based device 1210 or external to the device. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device or station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station." A mobile device may also be referred to as a mobile terminal, a terminal, a user equipment (UE), a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

The detailed description set forth above in connection with the appended drawings is provided to enable a person skilled in the art to make or use the disclosure. It is contemplated that various substitutions, alterations, and modifications may be made without departing from the spirit and scope of the disclosure. Throughout this disclosure the term "example" indicates an example or instance and does not imply or require any preference for the noted example. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments. Thus, the disclosure is not to be limited to the examples and designs described herein but is to be accorded the widest scope consistent with the principles and novel features disclosed herein.

Although particular embodiments have been disclosed herein in detail, this has been done by way of example for purposes of illustration only, and is not intended to be limiting with respect to the scope of the appended claims, which follow. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method, at a processor-based mobile device, to determine location of the mobile device, the method comprising:

determining a first set of candidate positions of the mobile device corresponding to a first time instance based, at least in part, on position data including a first set of identifiers decoded from signals including respective first one or more light-based communications received by the mobile device from a first one or more light devices, wherein the mobile device is located at a first location at the first time instance; and in response to a determination that the first set of candidate positions includes more than one candidate position derived based on the first one or more light-based communications, selecting at least one candidate position from the first set of candidate positions, in order to resolve positional ambiguity, based, at least in part, on further position data from further signals obtained at another time instance from one or more devices.

2. The method of claim 1, wherein selecting the at least one candidate position from the first set of candidate positions comprises:

selecting the at least one candidate position based further on a distance between the at least one candidate position and another location of the mobile device at the other time instance.

3. The method of claim 2, further comprising:

determining the further position data from the further signals at the other time instance, including determining another set of candidate positions of the mobile device corresponding to the other time instance based on: at least one RF signal from at least one wireless device, at least one identifier decoded from respective at least one light-based communication from at least one light device, or any combination thereof, wherein the other time instance precedes or is subsequent to the first time instance.

4. The method of claim 2, further comprising:

determining a maximum distance traveled by the mobile device based on a speed value of the mobile device and a time interval length between the other time instance and the first time instance.

5. The method of claim 4, further comprising:

determining the speed value based on: measurements from one or more sensors of the mobile device, a maximum speed value associated with the mobile device, or any combination thereof.

6. The method of claim 4, wherein selecting the at least one candidate position from the first set of candidate positions comprises:

eliminating another at least one candidate position from the first set of candidate positions located at a computed distance between the other least one candidate position and the another location of the mobile device exceeding the maximum distance.

7. The method of claim 1, further comprising:

in response to another determination that the selected at least one candidate position from the first set of candidate positions includes more than one candidate position, determining at a further time instance a further set of candidate positions of the mobile device based on: further one or more RF signals from further one or more wireless devices, further one or more identifiers decoded from respective further one or more light-based communications from further one or more light devices, or any combination thereof.

8. The method of claim 1, further comprising:

decoding data encoded in the first one or more light-based communications received at the first time instance.

9. The method of claim 8, wherein each of the first one or more light-based communications comprises a respective one of visual light communication (VLC) signal, and wherein decoding the encoded data comprises, for the each of the first one or more light-based communications:

capturing a corresponding at least part of at least one image of a scene, comprising a corresponding at least one light device emitting a corresponding VLC signal;

identifying from the captured corresponding at least part of the at least one image a corresponding time-domain signal representative of one or more symbols comprising a corresponding VLC codeword encoded in the corresponding VLC signal; and determining, at least in part, the corresponding VLC codeword from the corresponding time-domain signal identified from the corresponding captured at least part of the at least one image.

10. The method of claim 9, wherein capturing the corresponding at least part of the at least one image of the scene comprises:

capturing the corresponding at least part of the at least one image of the scene with a light-capture device of the mobile device.

11. The method of claim 10, wherein the light-capture device comprises a digital camera with a gradual-exposure mechanism.

12. The method of claim 11, wherein the digital camera with the gradual-exposure mechanism comprises a CMOS camera including a rolling shutter.

13. A mobile device comprising:

memory to store computer instructions; and one or more processors coupled to the memory, and configured to:

determine a first set of candidate positions of the mobile device corresponding to a first time instance based, at least in part, on position data including a first set of identifiers decoded from signals including respective first one or more light-based communications received by the mobile device from a first one or more light devices, wherein the mobile device is located at a first location at the first time instance; and in response to a determination that the first set of candidate positions includes more than one candidate position derived based on the first one or more light-based communications, select at least one candidate position from the first set of candidate positions, in order to resolve positional ambiguity, based, at least in part, on further position data from further signals obtained at another time instance from one or more devices.

14. The mobile device of claim 13, wherein the one or more processors configured to select the at least one candidate position from the first set of candidate positions are configured to:

select the at least one candidate position based further on a distance between the at least one candidate position and another location of the mobile device at the other time instance.

15. The mobile device of claim 14, wherein the one or more processors are further configured to:
   determine the further position data from the further signals at the other time instance, including to determine another set of candidate positions of the mobile device corresponding to the other time instance based on: at least one RF signal from at least one wireless device, at least one identifier decoded from respective at least one light-based communication from at least one light device, or any combination thereof, wherein the other time instance precedes or is subsequent to the first time instance.

16. The mobile device of claim 14, wherein the one or more processors are further configured to:
   determine a maximum distance traveled by the mobile device based on a speed value of the mobile device and a time interval length between the other time instance and the first time instance.

17. The mobile device of claim 13, wherein the one or more processors are configured to:
   decode data encoded in the first one or more light-based communications received at the first time instance.

18. The mobile device of claim 17, wherein each of the first one or more light-based communications comprises a respective one of visual light communication (VLC) signal;
   wherein the mobile device further comprises a light-capture device to capture a corresponding at least part of at least one image of a scene, comprising a corresponding at least one light device emitting a corresponding VLC signal;
   and wherein the one or more processors configured to decode the encoded data are configured to:
      identify from the captured corresponding at least part of the at least one image a corresponding time-domain signal representative of one or more symbols comprising a corresponding VLC codeword encoded in the corresponding VLC signal; and
      determine, at least in part, the corresponding VLC codeword from the corresponding time-domain signal identified from the corresponding captured at least part of the at least one image.

19. An apparatus comprising:
   means for determining a first set of candidate positions of a mobile device corresponding to a first time instance based, at least in part, on position data including a first set of identifiers decoded from signals including respective first one or more light-based communications received by the mobile device from a first one or more light devices, wherein the mobile device is located at a first location at the first time instance; and
   means for selecting at least one candidate position from the first set of candidate positions derived based on the first one or more light-based communications, in response to a determination that the first set of candidate positions includes more than one candidate position, in order to resolve positional ambiguity, based, at least in part, on further position data from further signals obtained at another time instance from one or more devices.

20. The apparatus of claim 19, wherein the means for selecting the at least one candidate position from the first set of candidate positions comprises:
   means for selecting the at least one candidate position based further on a distance between the at least one candidate position and another location of the mobile device at the other time instance.

21. The apparatus of claim 20, further comprising:
   means for determining the further position data from the further signals at the other time instance, including means for determining another set of candidate positions of the mobile device corresponding to the other time instance based on: at least one RF signal from at least one wireless device, at least one identifier decoded from respective at least one light-based communication from at least one light device, or any combination thereof, wherein the other time instance precedes or is subsequent to the first time instance.

22. The apparatus of claim 20, further comprising:
   means for determining a maximum distance traveled by the mobile device based on a speed value of the mobile device and a time interval length between the other time instance and the first time instance.

23. The apparatus of claim 19, further comprising:
   means for decoding data encoded in the first one or more light-based communications received at the first time instance.

24. The apparatus of claim 23, wherein each of the first one or more light-based communications comprises a respective one of visual light communication (VLC) signal, and wherein the means for decoding the encoded data comprises:
   means for capturing a corresponding at least part of at least one image of a scene, comprising a corresponding at least one light device emitting a corresponding VLC signal;
   means for identifying from the captured corresponding at least part of the at least one image a corresponding time-domain signal representative of one or more symbols comprising a corresponding VLC codeword encoded in the corresponding VLC signal; and
   means for determining, at least in part, the corresponding VLC codeword from the corresponding time-domain signal identified from the corresponding captured at least part of the at least one image.

25. A non-transitory computer readable media programmed with instructions, executable on a processor, to:
   determine a first set of candidate positions of a mobile device corresponding to a first time instance based, at least in part, on position data including a first set of identifiers decoded from signals including respective first one or more light-based communications received by the mobile device from a first one or more light devices, wherein the mobile device is located at a first location at the first time instance; and
   in response to a determination that the first set of candidate positions includes more than one candidate position derived based on the first one or more light-based communications, select at least one candidate position from the first set of candidate positions, in order to resolve positional ambiguity, based, at least in part, on further position data from further signals obtained at another time instance from one or more devices.

26. The non-transitory computer readable media of claim 25, wherein the instructions to select the at least one candidate position from the first set of candidate positions comprise one or more instructions to:

select the at least one candidate position based further on a distance between the at least one candidate position and another location of the mobile device at the other time instance.

27. The non-transitory computer readable media of claim 26, programmed with further instructions to:
    determine the further position data from the further signals at the other time instance, including to determine another set of candidate positions of the mobile device corresponding to the other time instance based on: at least one RF signal from at least one wireless device, at least one identifier decoded from respective at least one light-based communication from at least one light device, or any combination thereof, wherein the other time instance precedes or is subsequent to the first time instance.

28. The non-transitory computer readable media of claim 26, programmed with further instructions to:
    determine a maximum distance traveled by the mobile device based on a speed value of the mobile device and a time interval length between the other time instance and the first time instance.

29. The non-transitory computer readable media of claim 25, programmed with further instructions to:
    decode data encoded in the first one or more light-based communications received at the first time instance.

30. The non-transitory computer readable media of claim 29, wherein each of the first one or more light-based communications comprises a respective one of visual light communication (VLC) signal, and wherein the instructions to decode the encoded data comprise one or more instructions to:
    capture a corresponding at least part of at least one image of a scene, comprising a corresponding at least one light device emitting a corresponding VLC signal;
    identify from the captured corresponding at least part of the at least one image a corresponding time-domain signal representative of one or more symbols comprising a corresponding VLC codeword encoded in the corresponding VLC signal; and
    determine, at least in part, the corresponding VLC codeword from the corresponding time-domain signal identified from the corresponding captured at least part of the at least one image.

* * * * *